(12) United States Patent
Tang

(10) Patent No.: US 7,741,750 B1
(45) Date of Patent: Jun. 22, 2010

(54) INDUCTION MOTOR WITH IMPROVED TORQUE DENSITY

(75) Inventor: Yifan Tang, Los Altos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 23 days.

(21) Appl. No.: 12/317,730

(22) Filed: Dec. 29, 2008

(51) Int. Cl.
*H02K 1/06* (2006.01)
(52) U.S. Cl. .................. 310/216.004; 310/216.19; 310/216.94
(58) Field of Classification Search ............ 310/166, 310/216.4, 216.57, 216.12, 216.69, 216.93–216.94, 310/216.18–216.19, 216.112
See application file for complete search history.

(56) References Cited

U.S. PATENT DOCUMENTS

| | | | | |
|---|---|---|---|---|
| 5,753,991 A * | 5/1998 | Couture et al. | .......... | 310/156.46 |
| 5,793,139 A * | 8/1998 | Nashiki | .............. | 310/216.072 |
| 6,034,460 A | 3/2000 | Tajima et al. | | |
| 6,133,663 A * | 10/2000 | Hoemann | .................... | 310/180 |
| 6,144,132 A * | 11/2000 | Nashiki | ................. | 310/156.55 |
| 6,218,760 B1 * | 4/2001 | Sakuragi et al. | ....... | 310/216.111 |
| 6,747,387 B2 * | 6/2004 | Fujinaka | .............. | 310/216.091 |
| 6,750,583 B2 * | 6/2004 | Fujinaka | .............. | 310/216.096 |
| 7,098,567 B2 * | 8/2006 | Ionel et al. | ............ | 310/216.062 |
| 7,116,029 B2 | 10/2006 | Kerlin | | |
| 7,141,905 B2 * | 11/2006 | Vollmer | ............... | 310/216.112 |
| 7,247,967 B2 * | 7/2007 | Ionel et al. | ............ | 310/216.086 |
| 7,466,055 B2 * | 12/2008 | Toide et al. | ........... | 310/216.041 |

* cited by examiner

*Primary Examiner*—Thanh Lam

(57) ABSTRACT

An induction motor embodiment includes a stator defining a stator bore, the stator including a stator yoke having a stator yoke thickness and a plurality of stator teeth, the teeth having a common length, with each of the stator teeth including a stator tooth center portion that extends from a stator tooth bottom portion proximal the yoke to a stator tooth tip portion, with adjacent stator teeth defining a stator slot between them, each stator slot having a stator slot bottom that extends along a stator slot bottom length. In the embodiment, the center portion has a stator tooth width that is less than or equal to one half the stator slot bottom length. In the embodiment, the stator tooth width is smaller than a stator slot opening width distance. In the embodiment, a ratio of stator yoke thickness to stator tooth width is at least 5:1. A rotor is rotably mounted in the stator.

20 Claims, 29 Drawing Sheets
(20 of 29 Drawing Sheet(s) Filed in Color)

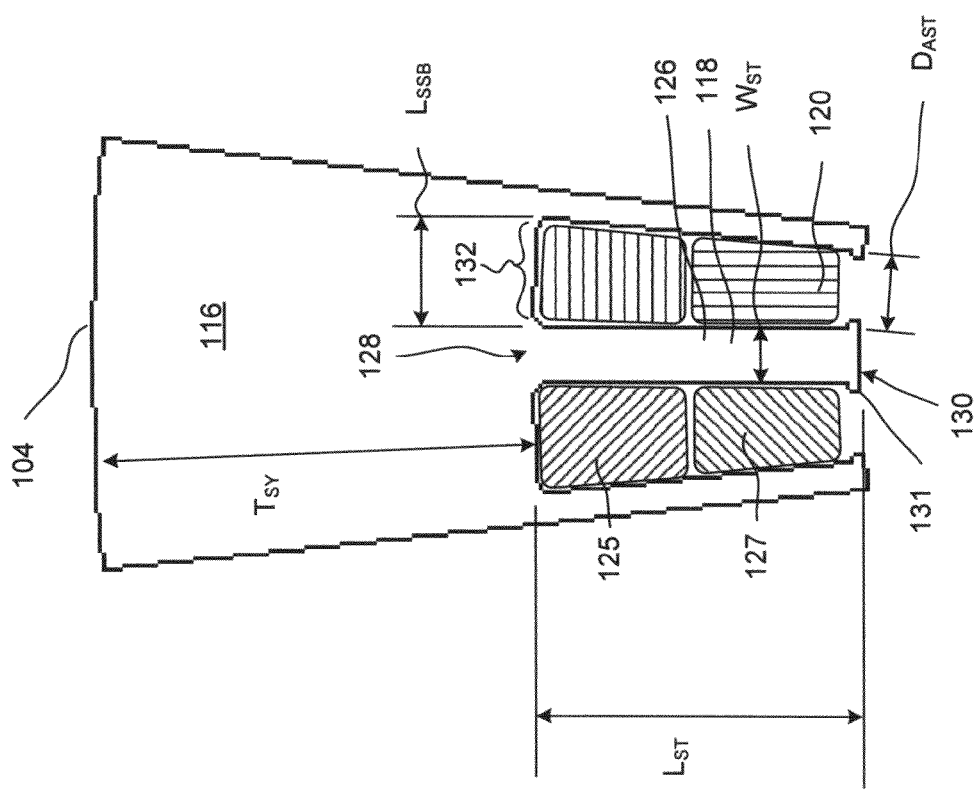

INDUCTION MOTOR WITH IMPROVED TORQUE DENSITY

BACKGROUND

Electric motors used in applications such as electric road vehicles should be able to provide varying torque, and at times very high torque peaks. High torque peaks enable drivers to experience quick acceleration or to climb a steep hill, for example. Many preexisting induction motors are unable to accommodate the widely varying torque levels drivers desire. These motors become magnetically saturated in too many real-world conditions. Those that do meet more torque demands often are not as efficient as is desired. Motors that resist saturation often suffer from other drawbacks, such as high cost, poor reliability, undesirable mass and undesired field weakening difficulty at high speeds. The undesired field weakening demonstrated by these motors decreases the torque available for drivers. An improved motor is desired that accommodates high peak torque demands while avoiding these drawbacks.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 shows a portion of a plate of a stator taken at line 2-2 in FIG. 1A, including a schematic illustration of windings.

DETAILED DESCRIPTION

Figure 1A:
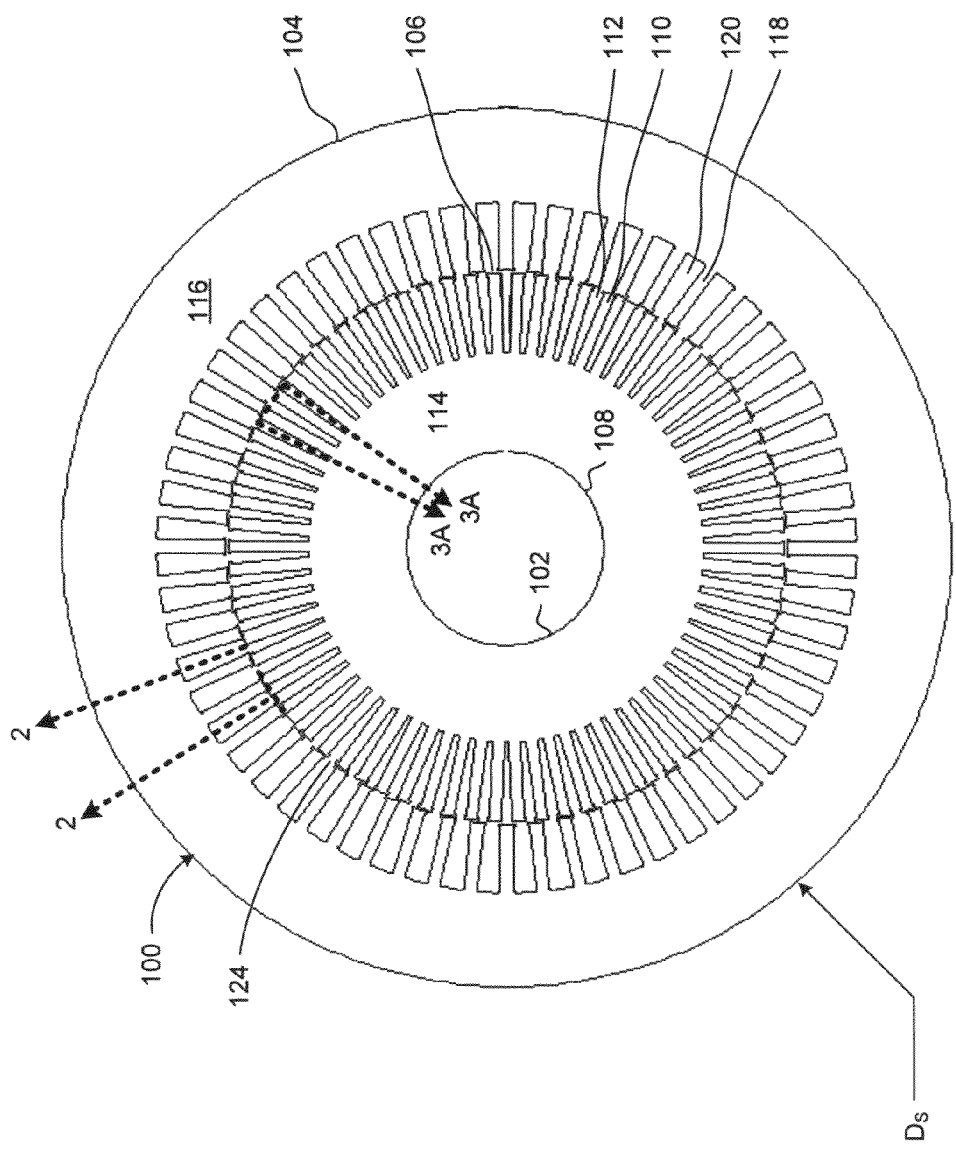
FIG. 1A shows an axial view of an improved induction motor, according to various embodiments.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The induction motors disclosed here address the needs of vehicles such as automobiles that wish to use induction motors for propulsion. Such vehicles include, but are not limited to, roadway capable battery powered electric vehicles ("EVs") and hybrid electric vehicles. The present subject provides examples of improved induction motors that perform better than a comparable existing or conventional induction motor in EV applications. A comparable motor is one having a similar external size and one that has access to a similar power supply.

Road-going EVs that are mass produced should be cost effective and should deliver torque near or at the levels of their fuel-burning counterparts. Unfortunately, conventional induction motors do not work well and do not achieve the torque levels that drivers desire. Conventional induction motor designs for modern high performance applications are described in the following references: (1) J. Kim, etc., "Optimal Stator Slot Design of Inverter-Fed Induction Motor in Consideration of Harmonic Losses," IEEE Transactions on Magnetics, Vol. 41, No. 5, May 2005, pp. 2012-2015; (2) S. Park, etc., "Stator Slot Shape Design of Induction Motors for Iron Loss Reduction," IEEE Transactions on Magnetics, Vol. 31, No. 3, May 1995, pp. 2004-2007; (3) J. L. Kirtley, Jr., "Designing Squirrel Cage Rotor Slots with High Conductivity," Proceedings of International Conference on Electric Machines, Krakow, Poland, Sep. 5-8, 2004, the subject matter of each of which is incorporated herein by reference in its entirety. They can work well in industrial applications, but these applications generally operate at a steady state with limited dynamic requirements. In addition, operating efficiency is often not a top priority in the motor design for an induction motor linked to a power line such as a municipal power grid. Industrial operating conditions differ from EV operating conditions that include, but are not limited to, long driving ranges, fast acceleration and deceleration and fast control dynamic response. For these and other reasons, others have relied on permanent magnet ("PM") motors for EVs.

However, PM motors suffer from many shortcomings. For example, PM motors suffer from field weakening at higher speeds. This limits the load the motor can be exposed to at higher speeds, which limits the torque it can produce. Limiting the speed range of the motor to avoid this problem is problematic, as vehicle designers seek availability of variable motor speeds so they can simplify or eliminate multi-speed transmissions or gearboxes. PM motors also suffer from demagnetization under certain environmental conditions and/or excitation conditions. Additionally, PM traction motors can be expensive to manufacture, as they require large, delicate and specialized magnets. Some designs also use more parts, which can add cost and decrease reliability.

To add high speed torque capability in PM motors, previous efforts have relied on size or power increases. Size increases are undesirable in automotive applications because weight affects range, acceleration and cost. Further attempts have relied on higher power. Higher power can increase operating temperatures, which can damage other parts of the car. Higher powered applications additionally require more expensive power converters.

Further attempts to increase high speed torque have resulted in hybrid PM-reluctance motor designs that add reluctance torque to the idealized conventional PM torque. Such hybrid motors have increased the complexity and cost of the mechanical structures. They also use control systems which have increased complexity and cost.

When induction motors have been used in EVs, they have suffered from performance problems, as is set out below in a number of charts that compare the performance of idealized conventional motors to that of the improved induction motors disclosed herein.

For electric car applications in general, induction motors produce from about 50 kilowatts to about 300 kilowatts of peak power, depending on particular vehicle design specifications. The present induction motors disclosed here provide high torque capability over a wide speed range. They provide this improvement without undesired increases in size and weight. Some of the motors disclosed here are able to produce short duration peak torque at 5 or more times that of continuous running torque. The level of the continuous running torque is generally limited by the ability of the motor to cool, as well as the efficiency of the motor. In some examples, the level of the peak torque is generally limited by electromagnetic considerations. In additional examples, the level of the peak torque is limited by external motor drive current. Providing a high ratio of peak torque to continuous running torque provides a number of benefits, including, but not limited to, fast acceleration, improved hill climbing, and a reduced or eliminated need for multi-speed transmissions.

Figure 19A:
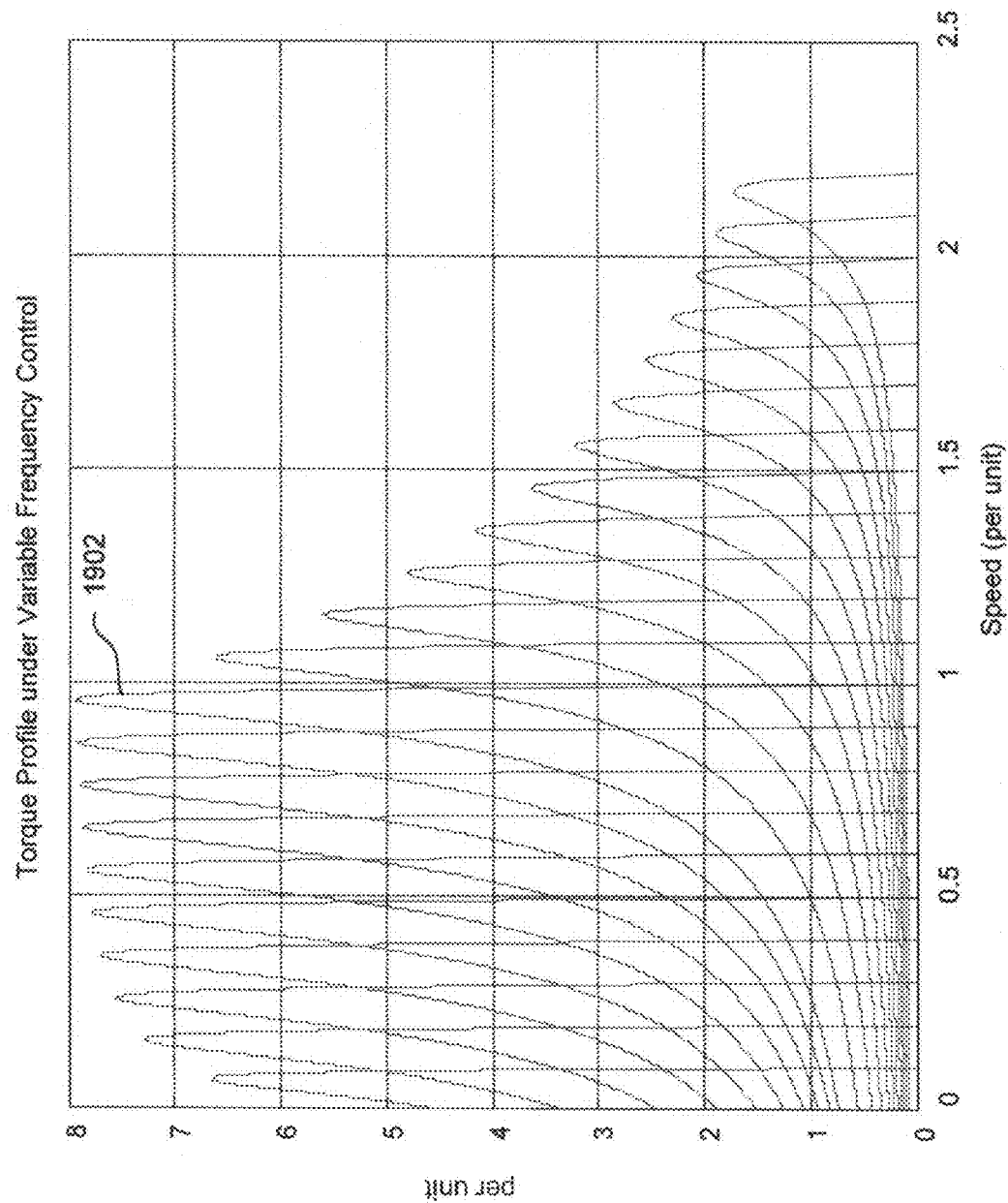
FIG. 19A is a diagram including several peak torque curves at different operating frequencies.
Figure 19B:
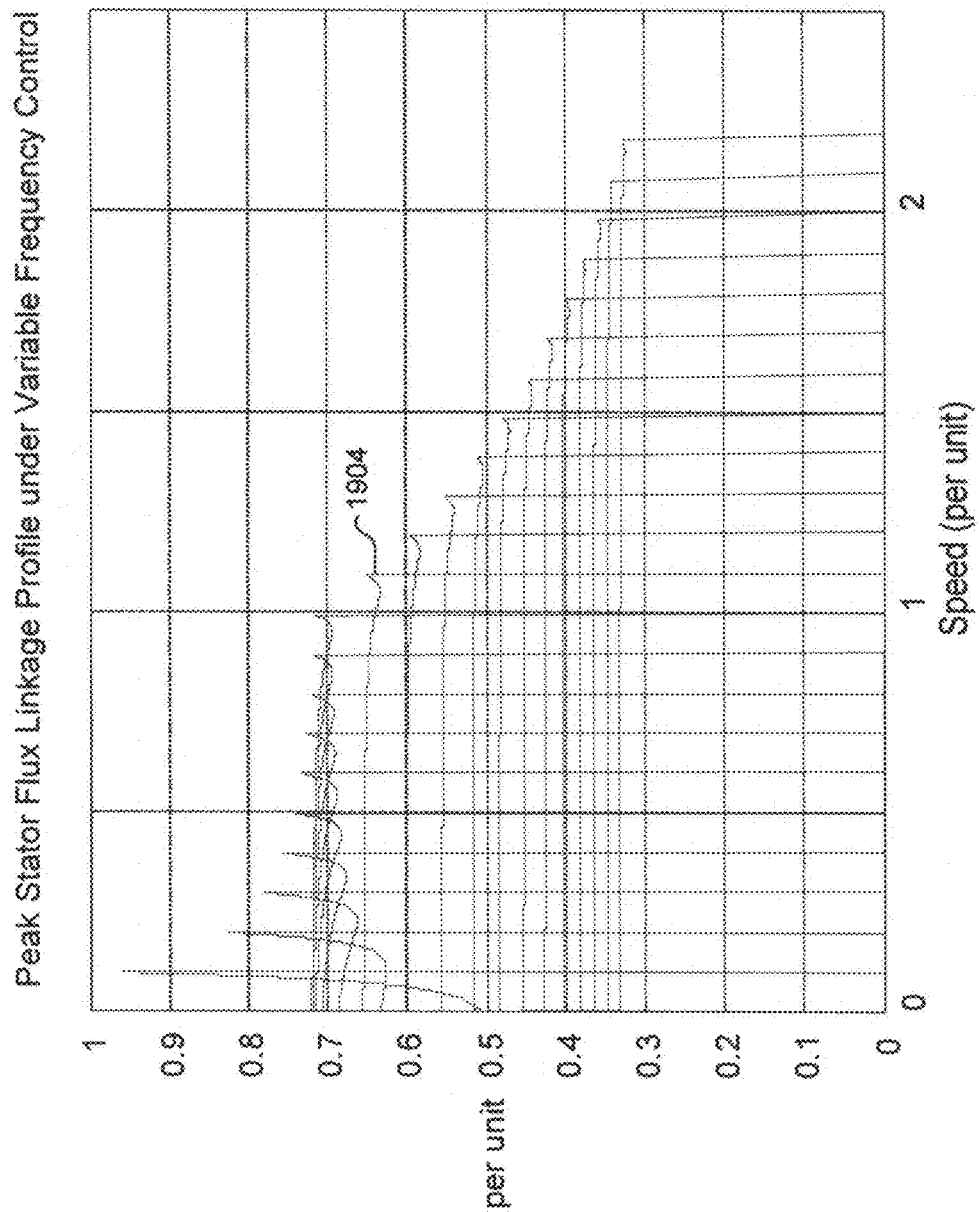
FIG. 19B is a diagram including several peak stator flux linkage curves at different operating frequencies.

The present induction motors may use improved magnetic steel sheet plate shapes (i.e., steel laminations) and associated waveforms, among other things, to produce improved acceleration and deceleration and to provide high torque for their size in a wide speed range, when compared to known existing conventional motors. In some embodiments, these improved induction motors reduce the cost of a power inverter because they reduce the stress on the inverter by lowering the required current and achieving a better power factor. Such motors are easier to package, as they are smaller. In various embodiments, these motors reduce switching losses, switching device ratings, and inverter and energy source power capacity ratings. In some embodiments, variable-voltage variable-frequency inverters are used (e.g., the curves of FIGS. 19A-B are generated with variable-voltage variable-frequency inverters).

Figure 15:
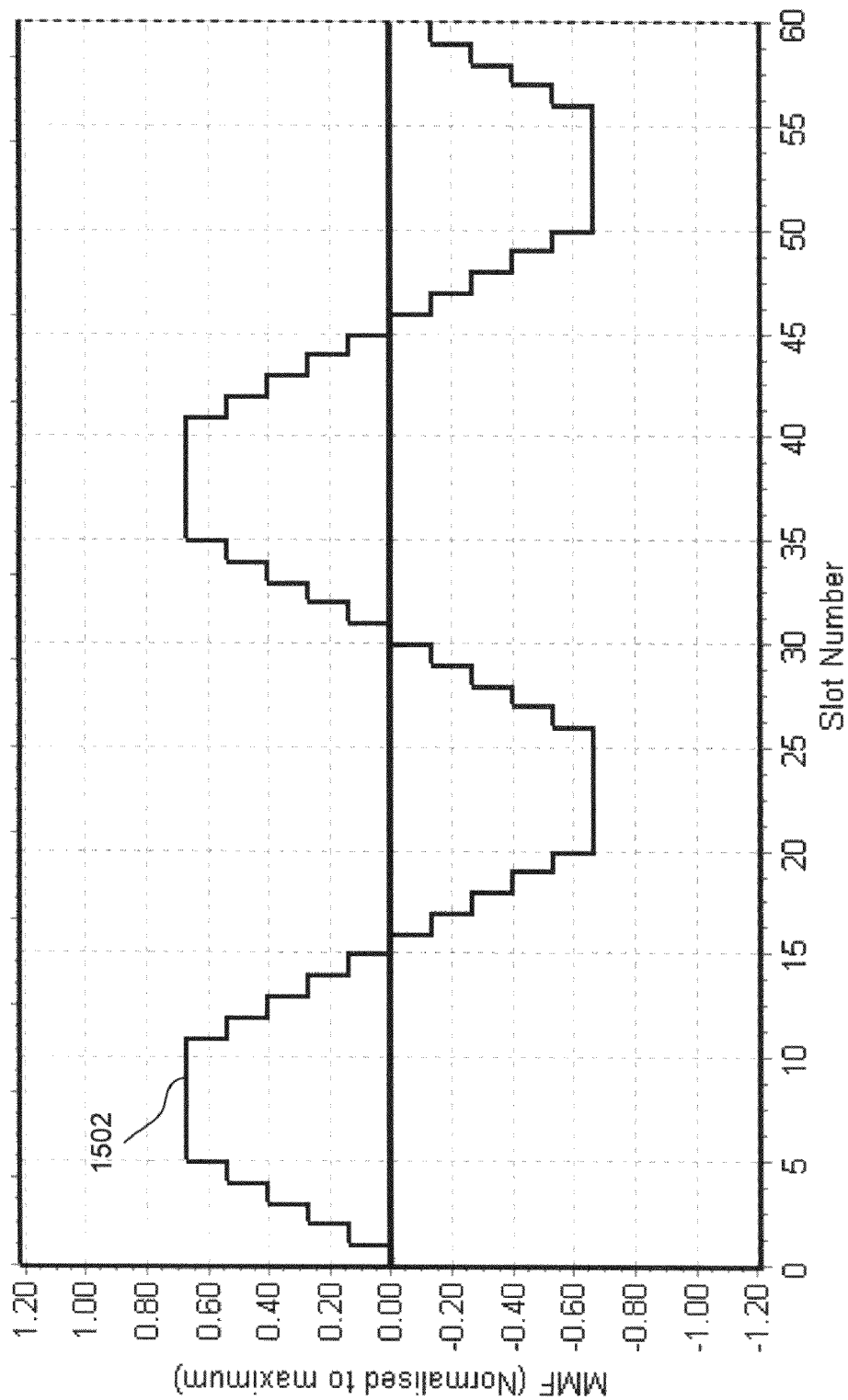
FIG. 15 is a diagram showing the total magneto-motive-force ("MMF") of a single phase of an example 4-pole configuration with short-pitch winding placement.
Figure 16:
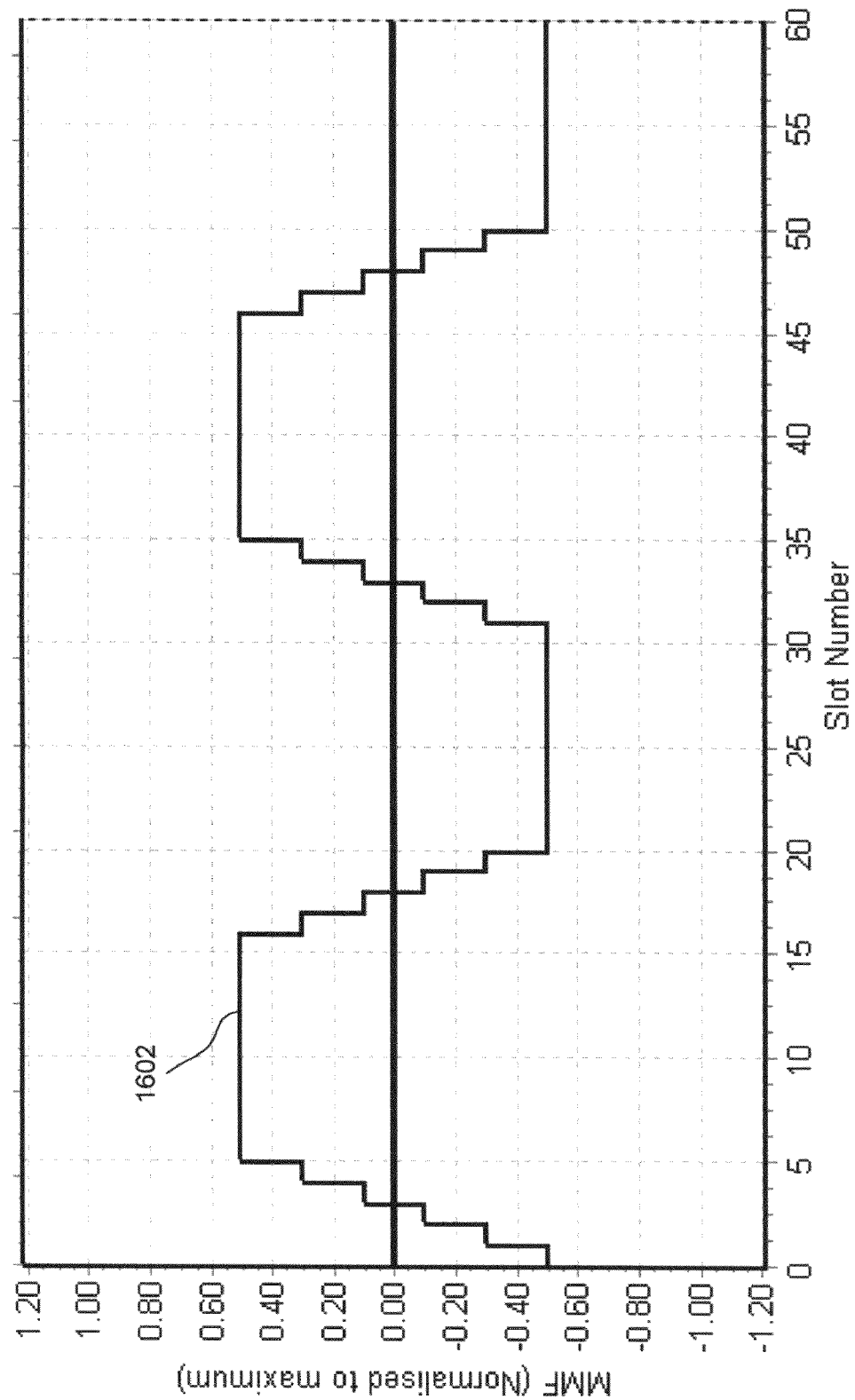
FIG. 16 is a diagram showing the total MMF of a phase of an example O-pole design with full-pitch winding placement.
Figure 20:
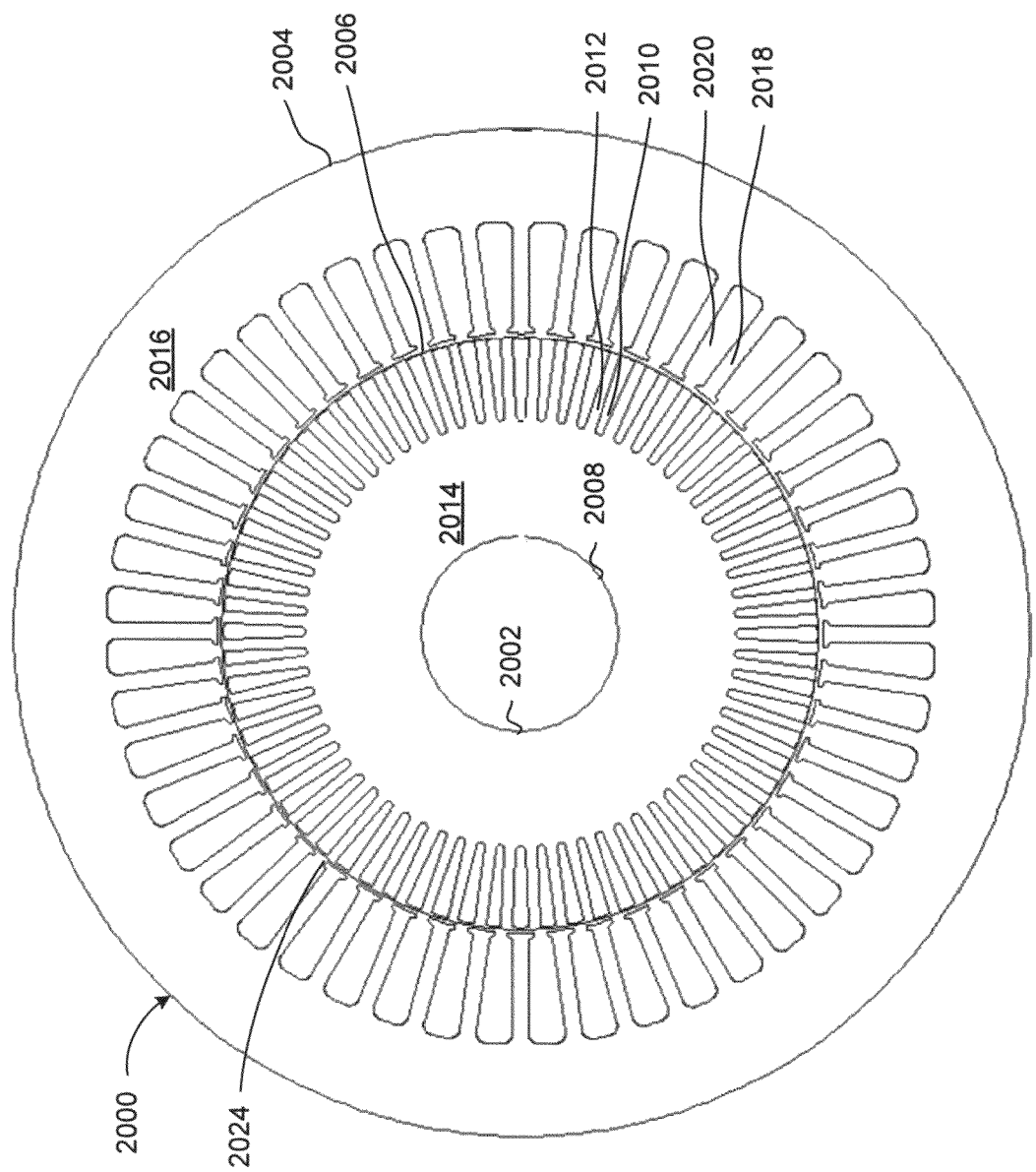
FIG. 20 shows an axial view of an additional embodiment of an improved induction motor, according to various embodiments.

Changes in plate shape versus a conventional design are discussed in FIGS. 1-3. Curves comparing features, characteristics and performance between an idealized conventional motor and an improved motor are set out in FIGS. 4-8. Waveforms for conventional motors and improved motors are discussed in relation to FIGS. 9-14. FIGS. 15 and 16 show MMF for two different winding configurations. FIGS. 17-19 provide performance metrics for an improved induction motor. FIG. 20 illustrates a further embodiment of an improved induction motor.

FIG. 1A shows an axial view of an improved induction motor 100, according to various embodiments. The diagram is simplified for the sake of explanation, as windings and other components are omitted. The general characteristics of the geometry when compared to a conventional induction motor include, but are not limited to, one or more of a radial air gap increased over the air gap size of conventional motors, a shorter axial stack length of the plate stack, wider stator slots, narrower stator teeth, narrower and shorter rotor teeth, a stator yoke that is thicker than the stator's tooth length and much thicker than the tooth width, a rotor yoke that is thicker than the rotor's tooth length and much thicker than the rotor's tooth width, an increased number of stator slots per pole per phase, and an increased number of rotor slots.

A rotor 102 is encircled by a stator 104. There is an air gap 106 between them. The air gap 106 between the stator 104 and rotor 102 is sized to obtain desirable levels of the magnetizing inductance and the leakage inductances, as disclosed here (e.g., FIGS. 4-8 show the performance of a conventional design compared to the performance of an improved design). The air gap 106 additionally has an effect on the saturation levels and harmonic levels of the magnetic flux proximal the air gap. In various embodiments, the air gap is at least 0.5 mm. A shaft 108 is coupled to the rotor 102. The shaft 108 can be coupled to downstream devices, including but not limited to an axle, a gearbox and the like.

The rotor 102 includes a plurality of rotor teeth 110. Between each tooth and the tooth next to it (i.e., between each tooth pair), is a rotor slot 112. The teeth define the slots between them. The rotor also has a rotor yoke 114. The stator 104 includes a stator yoke 116, a plurality of stator teeth 118, and stator slots 120 that are defined by the stator teeth 118. In various embodiments, the teeth and the yoke of the rotor are continuous blocks of material, i.e. monolithic. For example, in some embodiments, the rotor is comprised of a stack of plates electrically insulated from one another, and each of the plates is stamped or otherwise excised from a single piece.

Figure 1B:
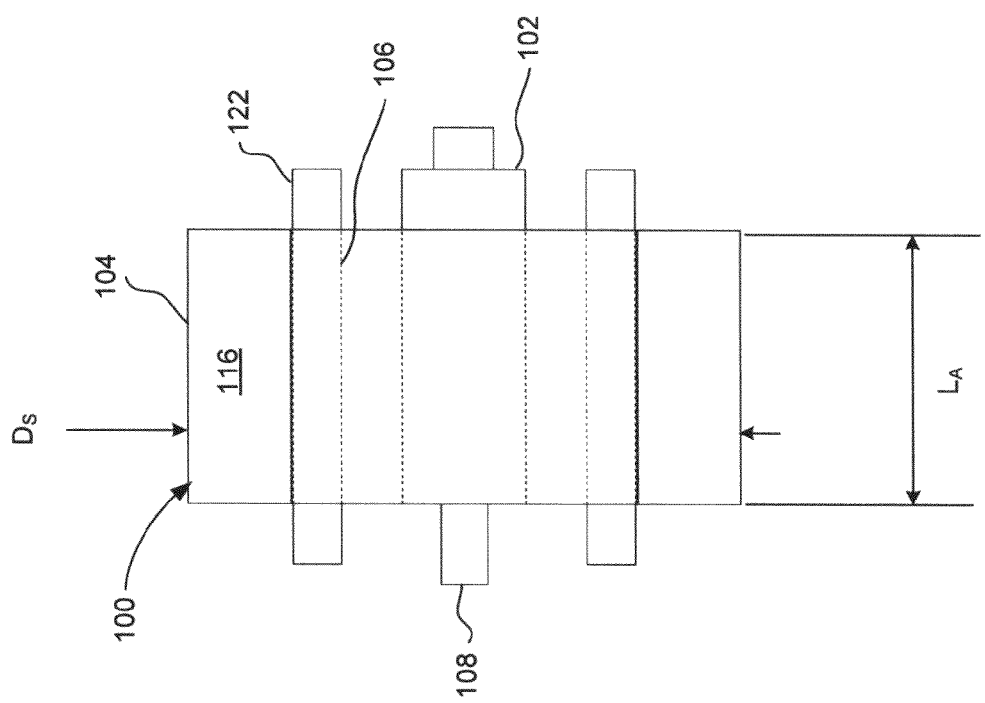
FIG. 1B shows a side view of the improved induction motor 100 of FIG. 1A.

FIG. 1B shows a side view of the improved induction motor 100 of FIG. 1A. The illustration shows the stator 104, the rotor 102, the air gap 106 and the shaft 108. The illustration also shows end rings 122. Various embodiments include rotor bars, stator windings or coils including an electrical insulation system, a frame, end caps, bearings, and other components. Some embodiments include speed and temperature sensors.

A plurality of windings is disposed around each of the stator teeth. In various embodiments the windings are copper, but other materials are possible. An example of a winding is shown in each of FIGS. 2-3. In various embodiments, the plurality of windings provides a plurality of poles. Some of the induction motor improved designs disclosed here are illustrated using three-phase induction motor examples, although other numbers of phases are possible, and the disclosed improvements are applicable to other numbers of phases. In various embodiments, the windings are configured to provide a total of twelve poles spread across three phases (i.e., 4-poles/phase, commonly referred to as a 4-pole motor, or a 2-pole pair motor).

In various embodiments, the stator is generally circular with a stator diameter $D_S$ (also seen in FIG. 1A) greater than an axial stator length $L_A$. Various embodiments have a stator diameter $D_S$ to axial stator length $L_A$ ratio of at least 2:1. In various embodiments, a plurality of plates is stacked along the stator length $L_A$ and defines the stator. In various embodiments, the teeth and the yoke of the stator are continuous blocks of material, i.e. monolithic. For example, in some embodiments the stator is comprised of a stack of plates electrically insulated from one another, and each of the plates is stamped or otherwise excised from a single billet.

Magnetic saturation occurs when an increasing magnetic field excitation level (also know as magnetic field intensity, or "H") fails to increase the resulting magnetic flux density (or "B") in a linear manner. In unsaturated states, the magnetic flux density is linearly proportional to the magnetic field intensity. Accordingly, as magnetic saturation increases, the responsiveness of magnetic flux density to changes in magnetic field intensity decreases.

Figure 1C:
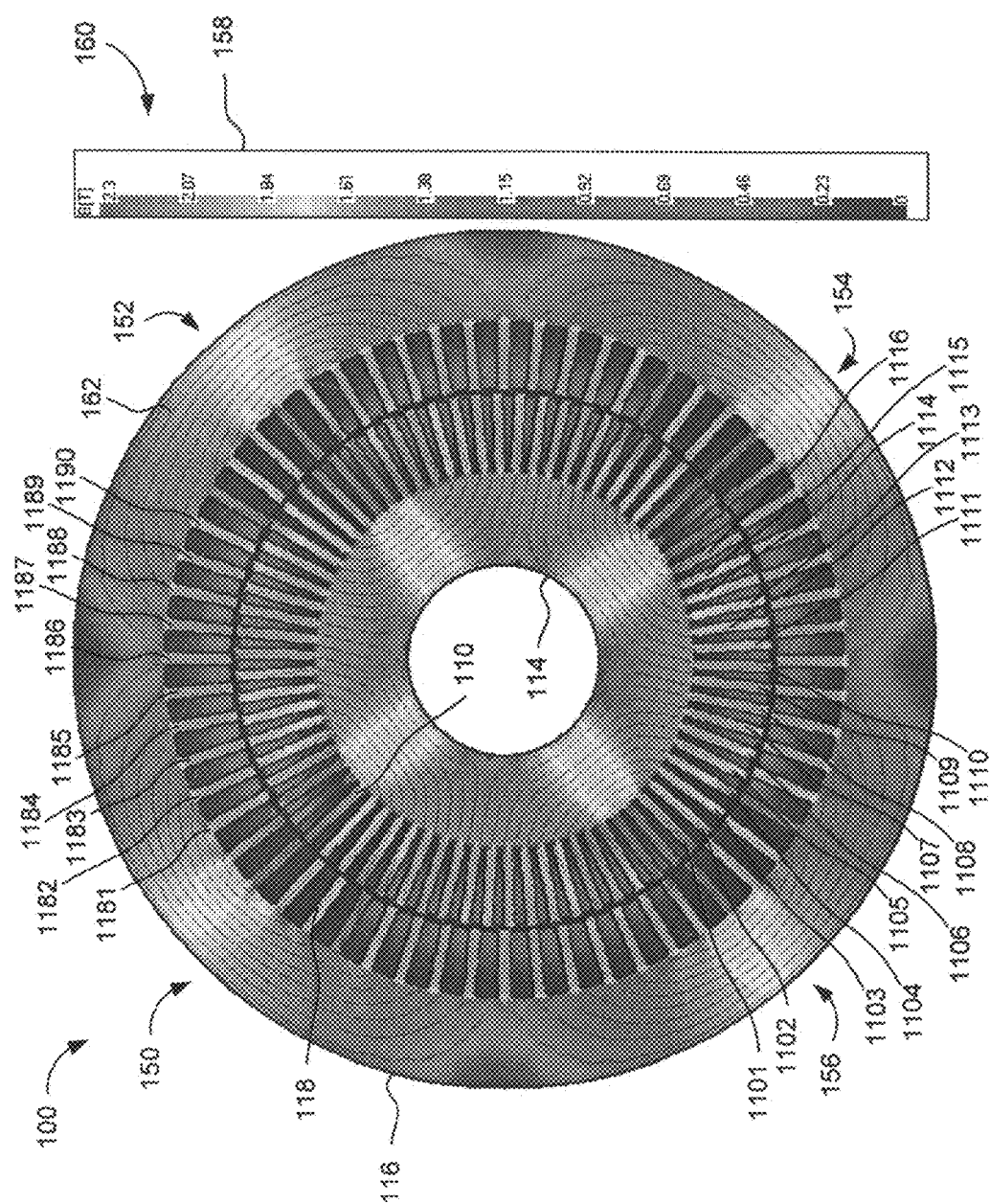
FIG. 1C illustrates an example magnetic field distribution for an improved induction motor.

FIG. 1C illustrates an example magnetic field distribution for an improved induction motor. The figure shows saturation levels and flux paths for a balanced three-phase excitation for a three-phase motor. The motor includes a first pole 150, a second pole 152, a third pole 154, and a fourth pole 156. A balanced three-phase excitation results in a symmetrical magnetic field distribution, in various embodiments.

The flux lines 152 represent circular and closed magnetic flux paths. The magnetic flux density level for the motor 150 is represented by a color distribution 158 that also includes flux density values ("B") expressed in Tesla units ("T"). Magnetic flux density levels near the top 160 of the scale represent deep saturation for laminations formed of magnetic steel. In various examples, a magnetic flux density level of at least 1.5 Tesla, with most at 2.0 Tesla and above, represents a deep magnetic saturation of the lamination at the particular location. In the figure, such a flux density is generally red in appearance.

In this example, most of the stator teeth 118 and most of the rotor teeth 110 carry flux lines 152 and are in deep saturation. The remainders of the teeth have flux density levels of lower than 2.0 Tesla. In some embodiments, the saturation level may be lower than 1.5 Tesla. The example further illustrates similarly saturated flux density in the stator teeth 118 and rotor teeth 110, and similarly unsaturated flux density in the stator yoke 116 and rotor yoke 114.

Figure 3A:
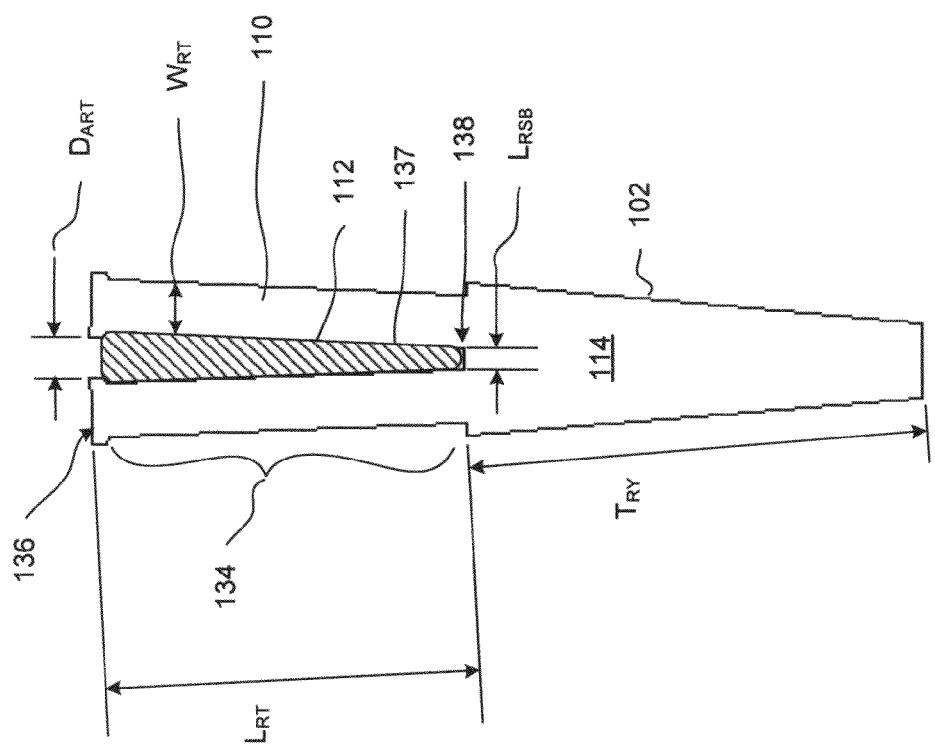
FIG. 3A shows a portion of a plate of a stator taken at line 3A-3A in FIG. 1A, including a schematic illustration of windings.
Figure 3B:
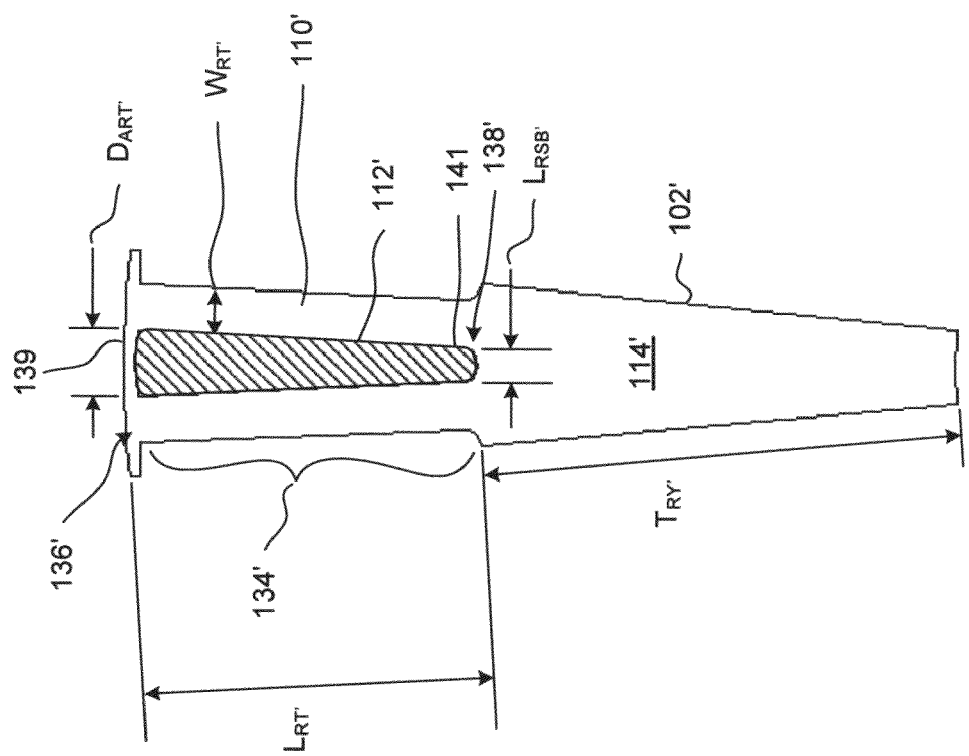
FIG. 3B shows an optional closed rotor slot motor for an improved induction motor, including a schematic illustration of windings.

FIG. 2 shows a portion of a plate of a stator taken at line 2-2 in FIG. 1A. FIG. 3A shows a section of a rotor taken at line 3A-3A in FIG. 1A. FIG. 3B shows an optional closed rotor slot motor for an improved induction motor, such as the motor illustrated in FIG. 20. In these figures, a portion of a plate is illustrated. In various embodiments, induction motors using these improved plate shapes are able to provide improved torque density versus that of a conventional motor.

Various embodiments include a stator 104 defining a stator bore 124. In various embodiments, a rotor 102 is mounted in the stator bore 124 to rotate in the stator bore 124. Bearings and/or other mounting apparatus may be used. The stator yoke 116 has a stator yoke thickness $T_{SY}$. A plurality of stator teeth (118 is typical of the plurality) are coupled to the stator yoke 116. In various embodiments, the stator teeth extend radially inward toward an axis of the stator bore. A solid conductor is illustrated having a first layer 125 and a second layer 127. A stator winding can include a bundle of wires, or it can be formed of a solid conductor (i.e., a rotor bar) as illustrated. The two coils in the stator slot define a two-layer winding. The coils may belong to the same phase or not. In additional embodiments, coils having a number of strands or windings are used. The present subject matter extends to embodiments having another number of layers as well. An adhesive or similar mounting structure can optionally occupy interstices to fix the position of the rotor bars.

The stator teeth have a common length $L_{ST}$. Each of the stator teeth includes a stator tooth center portion 126 that extends from a stator tooth bottom portion 128 proximal the yoke 116 to a stator tooth tip portion 130, with adjacent stator teeth defining a stator slot 120 between them. Each stator slot has a stator slot bottom portion 132 that extends along a stator slot bottom length $L_{SSB}$. In various embodiments, the stator slot bottom portion 132 is generally rounded. In various embodiments, the slot bottom length $L_{SSB}$ includes a flat bottom and radiused corners. In additional embodiments, the slot bottom is entirely arcuate. In various embodiments, the stator teeth have an approximately uniform width $W_{ST}$, not including the lip 131. In various embodiments, the tooth center portion 126 has a stator tooth width $W_{ST}$ that is less than or equal to one half the stator slot bottom length $L_{SSB}$. In some embodiments, the stator tooth width $W_{ST}$ is smaller than the stator slot opening width $D_{AST}$ between adjacent stator tooth center portions. In various embodiments, the distance $D_{AST}$ does not include the lip 131.

FIG. 3A illustrates an example portion of a rotor of an improved induction motor. The rotor 102 includes a rotor yoke 114. The rotor yoke 114 has a rotor yoke thickness $T_{RY}$. Coupled to the rotor are a plurality of rotor teeth (tooth 110 is typical of the plurality) that extend radially away from a center axis of the rotor. In various embodiments, each of the teeth includes a rotor tooth center portion 134 and a rotor tooth tip portion 136. Between adjacent rotor teeth is a rotor slot 112 having a bottom portion 138. The slot bottom portion 138 has a slot bottom length $L_{RSB}$. The rotor teeth have a common length $L_{RT}$. The distance between the tips of the rotor teeth in this embodiment is $D_{ART}$. A single layer winding 137 comprising a solid conductor (i.e., a rotor bar) is shown disposed in the slot 112. The slot 112 may be filled with a coil that can be solid or that can include windings. In various embodiments, the windings extend to the top of the slot 112, proximal the tip portion 136. The coil material, in various embodiments, is formed of one or more materials including, but not limited to, copper and aluminum.

Stators of the improved induction motors described here have a higher than conventional thickness $T_{SY}$ to stator tooth width $W_{ST}$ ratio, as is illustrated in FIG. 2. Rotors of these motors have a high rotor yoke thickness $T_{RY}$ to rotor tooth width ratio $W_{RT}$. These ratios provide a difference in the saturation levels of the yoke and the teeth for the rotor and the stator (i.e. the difference in the flux density level) that is improved when compared to conventional induction motors. For example, in 4-pole/phase and higher pole/phase count induction motors the ratio of the flux density in the yoke to the tooth for one or both of the stator and the rotor may be at least 5:1 or more. In a 2-pole/phase induction motor, the ratio may be at least 5:1.

In various embodiments, stator yoke thickness $T_{SY}$, as is illustrated in FIG. 2, is larger than the stator tooth length $L_{ST}$, and the rotor yoke thickness $T_{RY}$ is larger than rotor tooth length $L_{RT}$. In various embodiments, a sum of the stator yoke thickness $T_{SY}$ and the stator tooth length $L_{ST}$ approximately equals a sum of the rotor yoke thickness $T_{RY}$ and a rotor tooth length $L_{RT}$.

In various embodiments, the plates of the rotor and of the stator are shaped so that a maximum inverter drive current for peak torque load will drive at least two or more or most of the stator and rotor teeth of each pole of each phase into deep magnetic saturation. Some examples simultaneously saturate all of the stator and rotor teeth of the induction motor. In these examples, most of the teeth are in deep saturation, as described above in association with FIG. 1C, while the stator and rotor yokes are in light magnetic saturation, or are not saturated at all. Light magnetic saturation is a saturation level less than 2.0 Tesla. In various embodiments, the saturation levels of the rotor teeth and the stator teeth across an air gap between the rotor and stator are at approximately equal levels.

Various embodiments use a high stator and rotor tooth number combination. In some examples, there are more rotor teeth than stator teeth. The example of FIG. 1A includes 60 stator teeth and 74 rotor teeth. Various embodiments use around a 1:1 ratio of stator tooth width $W_{ST}$ to rotor tooth width $W_{RT}$. In some embodiments, the ratio between the two tooth widths is less than or equal to one-fourth of each other. Various embodiments have at least 4 stator teeth per pole per phase, although other numbers are possible. For example, in some embodiments, each of the rotor teeth has a rotor tooth center portion 134 that extends from a rotor tooth bottom portion 138 proximal the rotor yoke 102 to a rotor tooth tip portion 136, the rotor center portion 138 having a rotor tooth width $W_{RT}$, wherein a ratio between the rotor tooth width $W_{RT}$ and the stator tooth width $W_{ST}$ is between 3:4 and 4:3.

FIG. 3B shows an optional closed rotor slot motor for an improved induction motor. A closed rotor slot motor has improved aerodynamics, including reduced windage losses. Further, the design can be easier to manufacture. For example, it is easier to manufacture embodiments in which the rotor bars are made from a low cost die-cast copper or aluminum injection process. A winding 141 is shown in the form of a rotor bar. In various embodiments, the rotor teeth of FIGS. 3A and 3B are similarly shaped to those in FIG. 3B, but for the tooth tip closure portions (139 is typical) that bridge tooth tips. The tip closure portion improves the mutual coupling of the stator and rotor electromagnetic fields in various embodiments. Under high torque load conditions, the tip closure portions 139 are driven into deep magnetic saturation so that the tip closure portions 139 approximate function of open air in an open slot motor. In these examples, the magnetic flux distribution of the closed rotor slot motor resembles the open rotor slot motor under high torque conditions.

A number of comparison curves show characteristics and performance of example embodiments. To increase the peak torque capability of the motor without increasing the motor size and drive voltage and current, the air gap flux linkage is increased by increasing the flux density level in the air gap. In various examples, this is achieved with magnetic steel material.

FIGS. 4-17 demonstrate characteristics and performance of a conventional motor and several improved induction motors. For these curves, the same power inverter is used to drive the conventional motors and the improved motors, and the conventional motors and the improved motors have similar external sizes, such as having the same stator outside diameters. The curves illustrate that the improved induction motors provide higher magnetizing inductance, lower leakage inductances, higher stator flux linkage, and higher air-gap flux linkage. One or more of these characteristics, alone or in combination, provide a higher torque capability with the same drive current.

Figure 4:
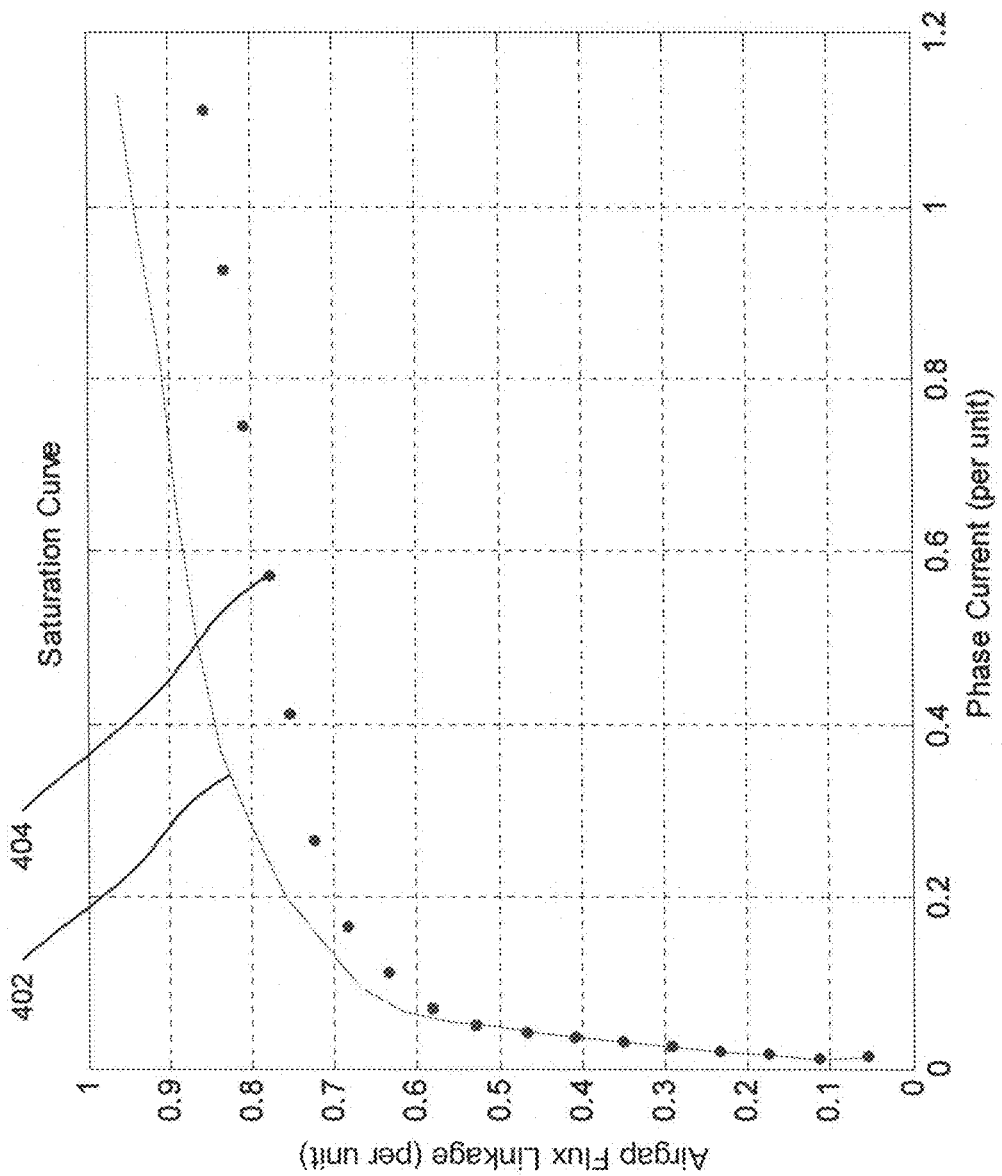
FIG. 4 is a diagram showing an increased air gap flux linkage of an example of an improved induction motor for high torque density.
Figure 5:
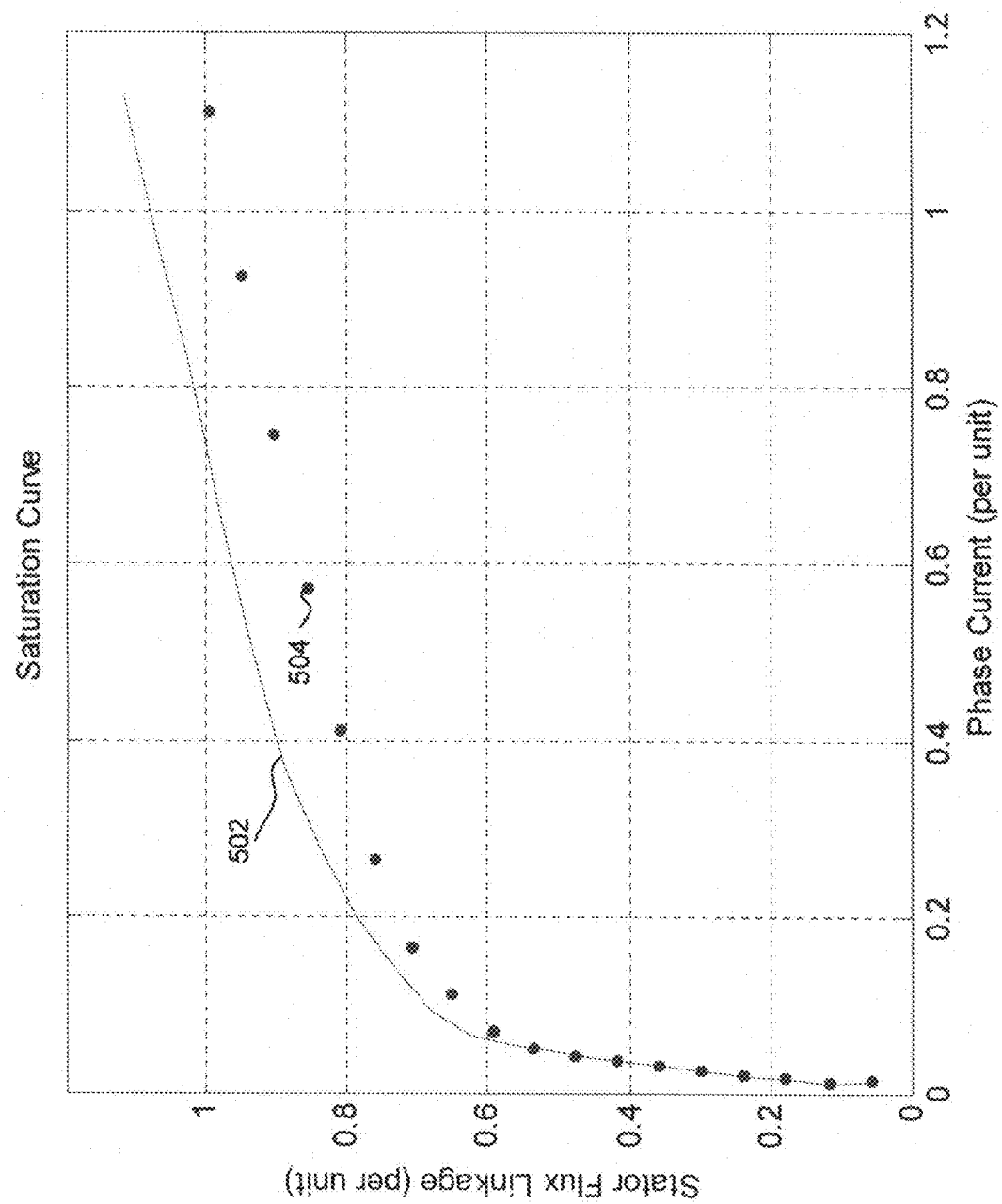
FIG. 5 is a diagram showing a higher stator flux linkage for one example of an improved induction motor.

FIG. 4 is a diagram showing an increased air gap flux linkage of an example of an improved induction motor for high torque density, such as the motor illustrated in FIG. 1A. The improved embodiment is represented by a solid line 402, and the conventional motor is shown as a dotted line 404. The curve represents air-gap flux linkage as a function of phase current. The air-gap flux linkage illustrated in FIG. 4 and the stator flux linkage illustrated in FIG. 5 represent the fluxes passing through areas associated with current carrying stator windings and rotor bars. More specifically, the air-gap flux linkage of a single phase refers to the flux linked by both the stator windings and the rotor bars of the phase, whereas the stator flux linkage of a phase refers to the total flux linked by the stator windings of the phase.

"Per unit" refers to the per-unit measurement system for power electronics, in which an actual value of a physical variable is divided by a certain fixed base value of the same variable, the base value often being the nominal value or the maximum rating value. For a given plate constructed from a material such as magnetic steel, saturation level is represented by a B-H curve, where as noted earlier B represents magnetic flux density and H represents magnetic field intensity.

The magnetic material B-H curve resembles the shape of the curves shown in FIG. 4, as the air-gap flux linkage is proportional to B and the phase current is proportional to H. The improved induction motor operates in saturation mode starting at less than 0.1 p.u. (per unit) drive current, and goes into deeper saturation when the phase current is increased to 1.0 p.u. One p.u. in this example is the power inverter maximum drive RMS current rating. FIG. 4 illustrates some of the characteristics of the improved design based on configurations of the present subject matter.

FIG. 5 is a diagram showing a higher stator flux linkage for one example of an improved induction motor, such as the motor illustrated in FIG. 1A. The improved embodiment is represented by a solid line 502, and the conventional motor is shown as a dotted line 504. The difference between the air-gap flux linkage of FIG. 4 (taken at a phase current) and the stator flux linkage of FIG. 5 is the stator leakage flux. The stator leakage flux represents the flux produced by excited stator windings that are not linking with rotor bars.

For a given drive current, the stator leakage inductance is reduced for the improved induction motor, thus reducing the stator leakage flux. According to certain embodiments of the present subject matter, both the stator and rotor leakage inductances are reduced in the improved induction motor. In various embodiments, increasing the air gap in the radial direction reduces leakage flux by increasing the leakage flux path reluctance through the air. Shortening the axial stack or rotor length also reduces the total leakage flux for the same reason. Narrower stator teeth and narrower rotor teeth facilitate the deeper magnetic saturation of the stator teeth and the rotor teeth. This also results in the saturation of the stator and rotor leakage inductances. The reduced leakage inductances increase the breakdown torque (i.e., pull-out torque) especially at high speeds, resulting in an improved peak torque capability.

Figure 6:
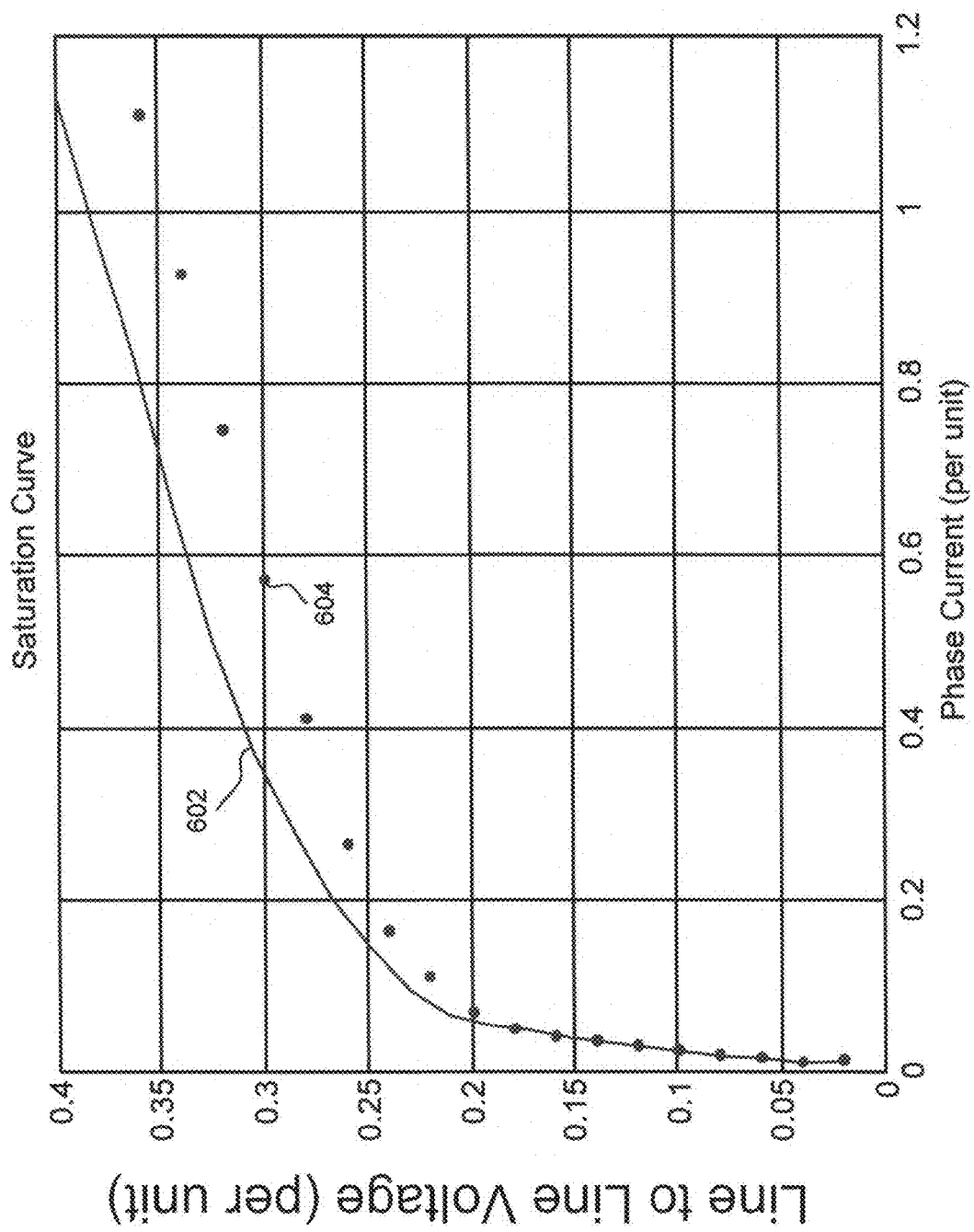
FIG. 6 is a diagram of a saturation curve shown as motor terminal line-to-line voltage as a function of phase current, according to some embodiments.

FIG. 6 is a diagram of a saturation curve shown as motor terminal line-to-line voltage as a function of phase current, for an improved induction motor such as the motor illustrated in FIG. 1A. An improved motor embodiment is shown as a solid line 602, whereas a conventional motor is shown as a dotted line 604. In saturation, for the same current, the improved induction motor operates at a higher terminal voltage. This is an indication that more electrical power, which is proportional to a product of voltage and current, and which is transmitted to the motor to produce a higher torque, despite construction of the motors from the same magnetic material with the same material saturation limitation according to the material B-H curve. FIG. 6 illustrates a desirable characteristic of an improved induction motor according to certain embodiments of the present subject matter.

Figure 7:
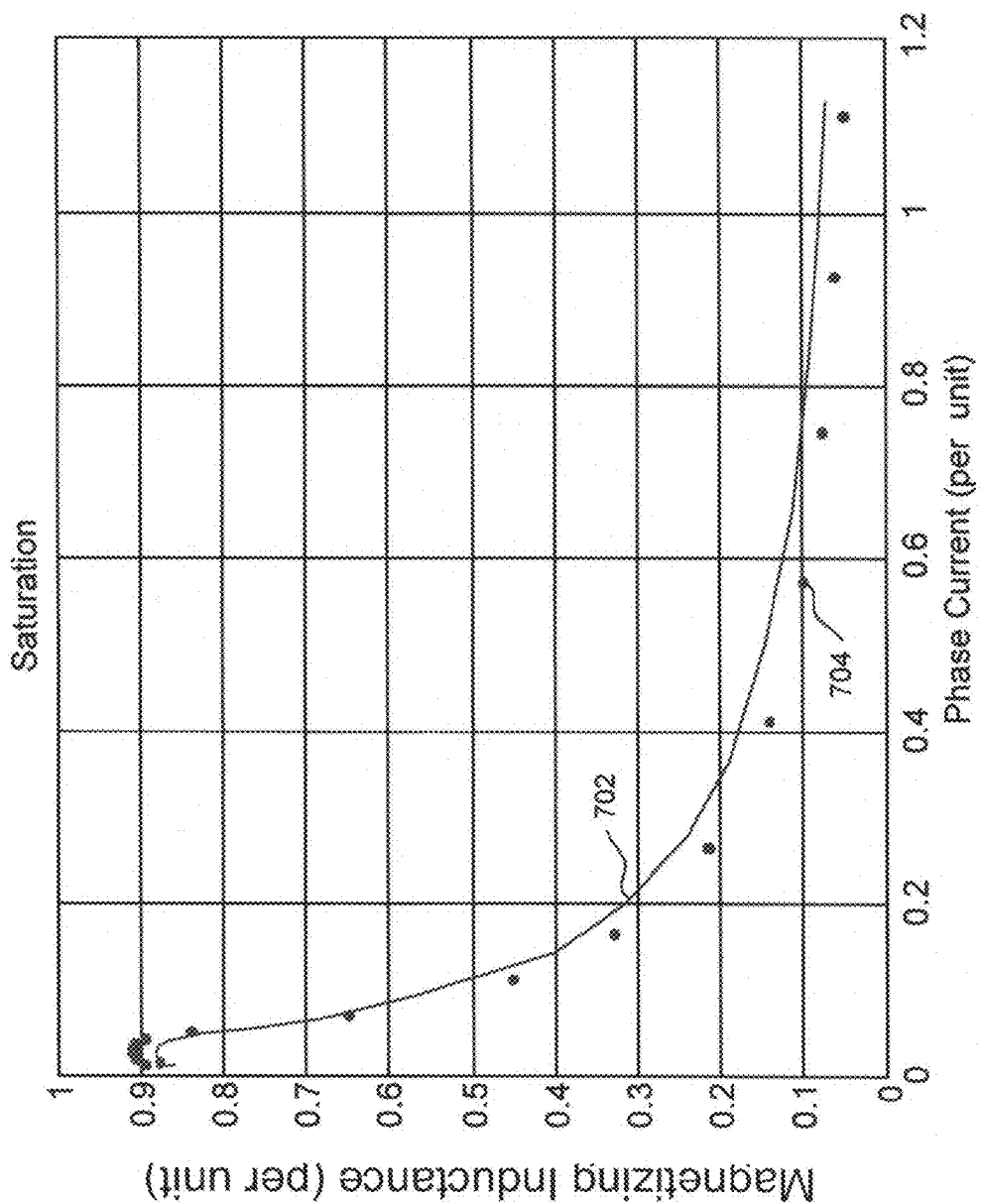
FIG. 7 is a diagram of a saturation curve of an improved induction motor shown as saturated magnetizing inductance as a function of phase current, according to some embodiments.

FIG. 7 is a diagram of a saturation curve of an improved induction motor shown as saturated magnetizing inductance as a function of phase current, for an improved induction motor such as the motor illustrated in FIG. 1A. Again, the improved embodiment is represented by a solid line 702, and the conventional motor is shown as a dotted line 704. An increase in the magnetizing inductance can be noted in a saturated operating condition, which generally occurs when the phase current is higher than 0.1 per unit.

Figure 8:
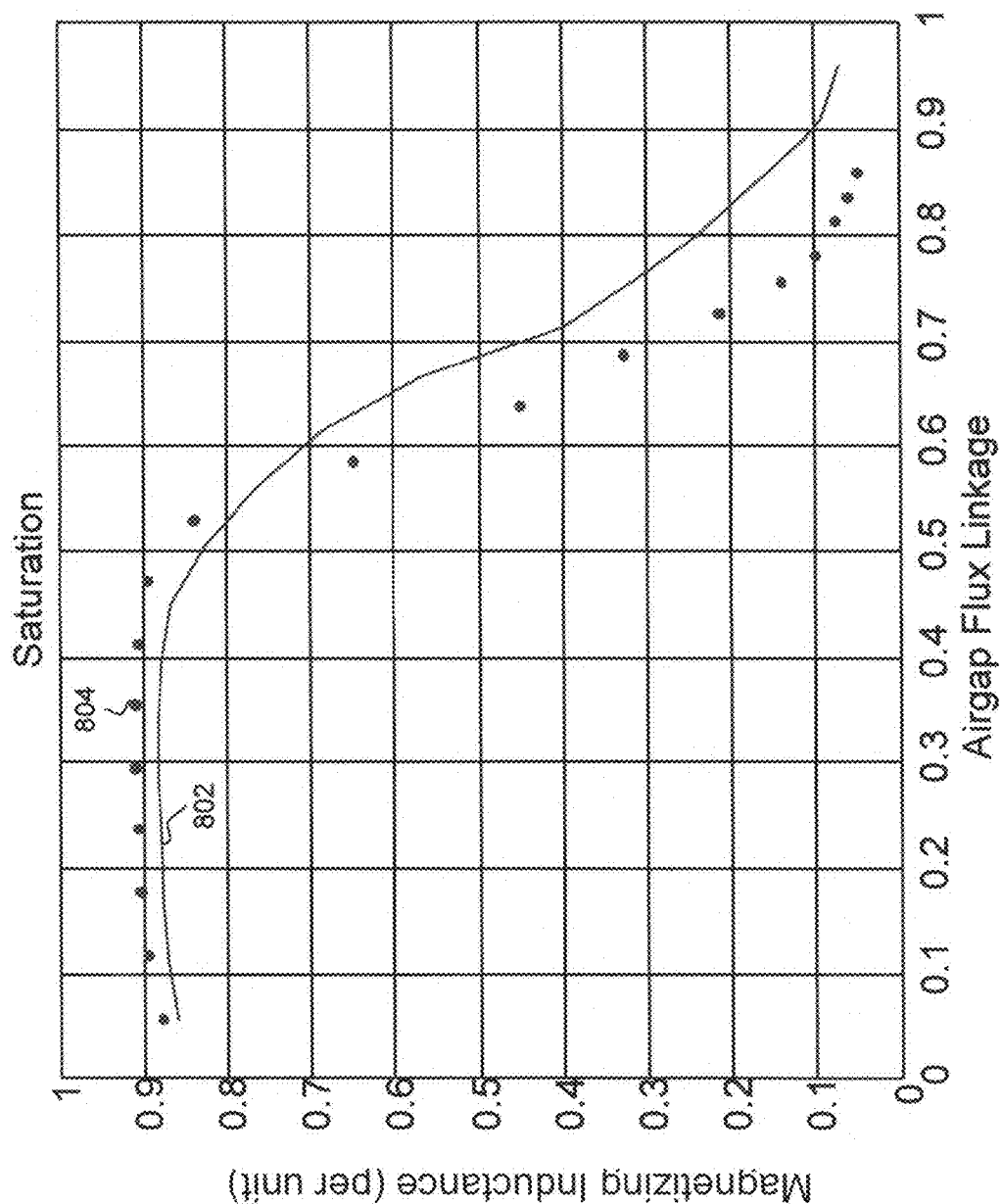
FIG. 8 is a diagram of a saturation curve of an improved induction motor shown as saturated magnetizing inductance as a function of air gap flux linkage, according to some embodiments.

FIG. 8 is a diagram of a saturation curve of an improved induction motor shown as saturated magnetizing inductance as a function of air-gap flux linkage, for an improved induction motor such as the motor illustrated in FIG. 1A. The improved embodiment is represented by a solid line 802, and the conventional motor is shown as a dotted line 804. FIGS. 4 through 8 disclose characteristics of the improved induction motors according to certain embodiments of the present subject matter, illustrated via the relationships among important motor parameters including air gap flux linkage, stator flux linkage, line to line voltage, magnetizing inductance and phase current.

Figure 9:
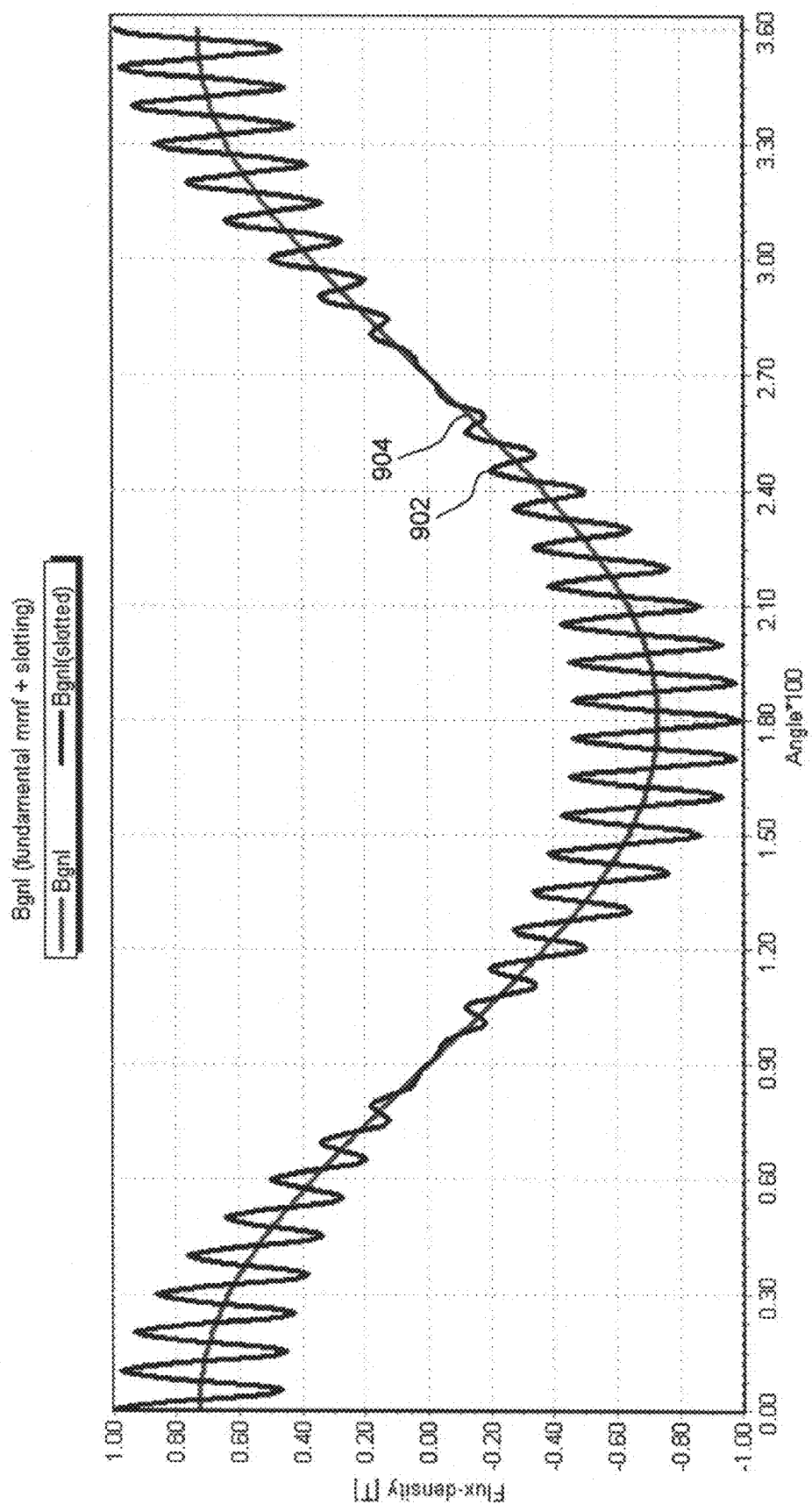
FIG. 9 is a diagram showing flux density distribution in the air gap versus electrical angle between a rotor and a stator of an idealized conventional induction motor, at a given instant of time under a balanced three-phase excitation.

FIG. 9 shows flux density distribution in the air gap for an idealized conventional induction motor, versus electrical angle between a rotor and a stator, at a given instant of time under a balanced three-phase excitation, according to some embodiments. The electrical angle from 0 to 360 degrees is a span that covers a pair of opposing poles. The shape of a waveform depends on the number of motor poles. Different waveforms are generated if the physical (i.e., mechanical) angle of the rotor with respect to the stator changes. One differentiates electrical angle from mechanical angle because the poles can rotate around the stator, even if the rotor is not moving with respect to the stator.

High-frequency sinusoidal ripples 902 are shown to be superimposed over a sinusoidal fundamental curve 904. The fundamental curve is defined by a series of values that represent the instantaneous value of the flux density minus slot ripples having a higher frequency than that of the fundamental waveform. The fundamental value has a first fundamental sinusoidal component. A substantially square, trapezoidal shaped waveform can be decomposed into a first fundamental sinusoidal component as well as multiple higher order sinusoidal components using Fourier transforms. These multiple higher-order sinusoidal components are also commonly referred to as harmonics. The ripples 902 are due to the slotting effects of the stator and rotor slots.

Figure 10:
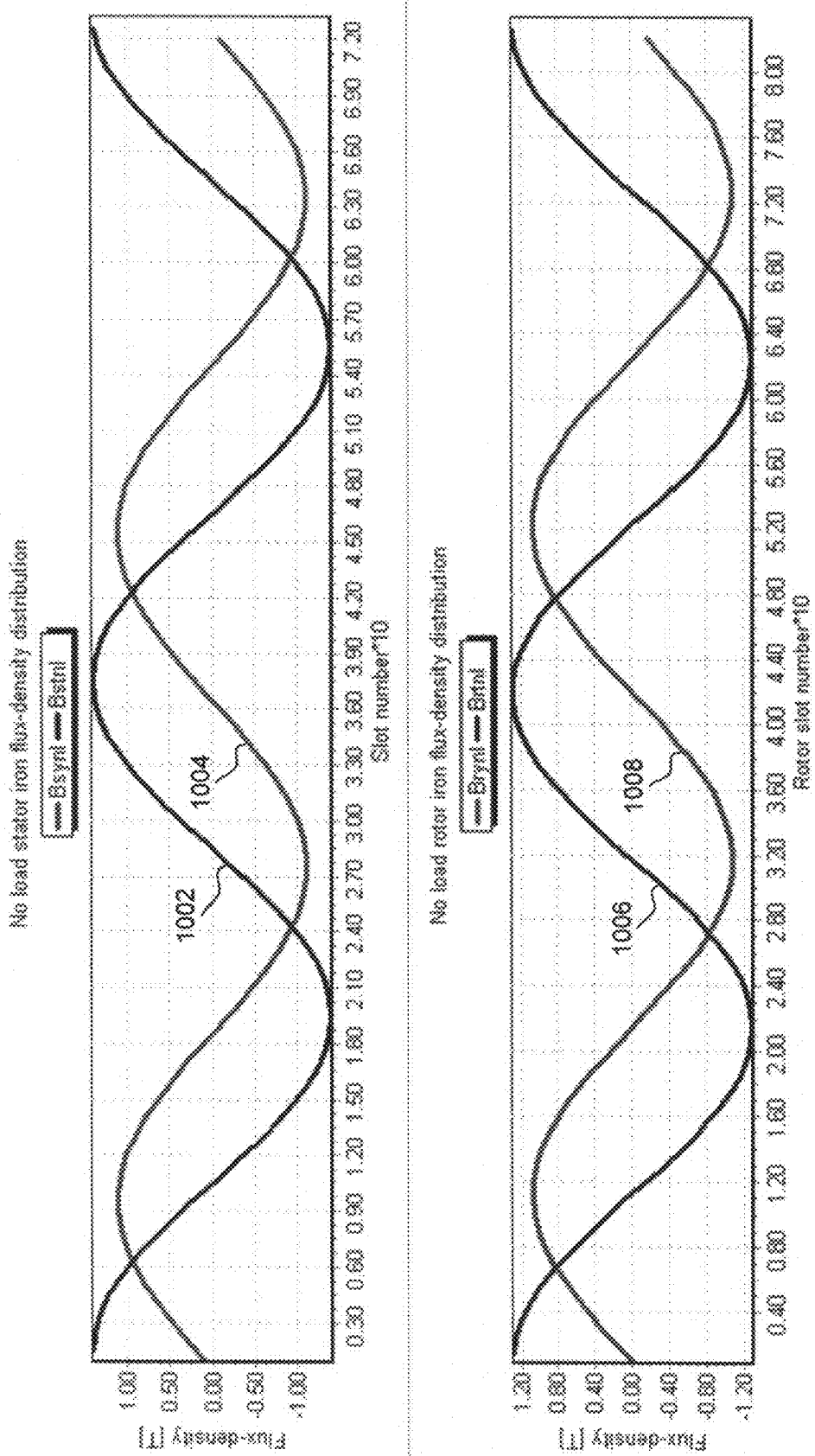
FIG. 10 is a diagram of two different idealized conventional motors showing, in an upper portion, stator yoke flux density and flux density for the stator teeth for a stator having 72 slots, and in a lower portion, rotor yoke flux density and flux density for the rotor teeth for a rotor having 82 slots.

FIG. 10 is a diagram showing, in an upper portion, stator yoke flux density 1004 and flux density for the stator teeth 1002 for an idealized conventional stator having 72 slots. In a bottom portion, stator yoke flux density 1008 and flux density for the stator teeth 1006 for a rotor having 82 slots is illustrated. The prefixes Bg, Bsy, Bst, Bry and Brt represent flux densities of air gap, stator yoke, stator tooth, rotor yoke and rotor tooth, respectively. The additional suffix "nl" represents no-load, which is an operating condition, established in the induction motor arts, to characterize magnetic saturation capability of the motor.

Figure 11:
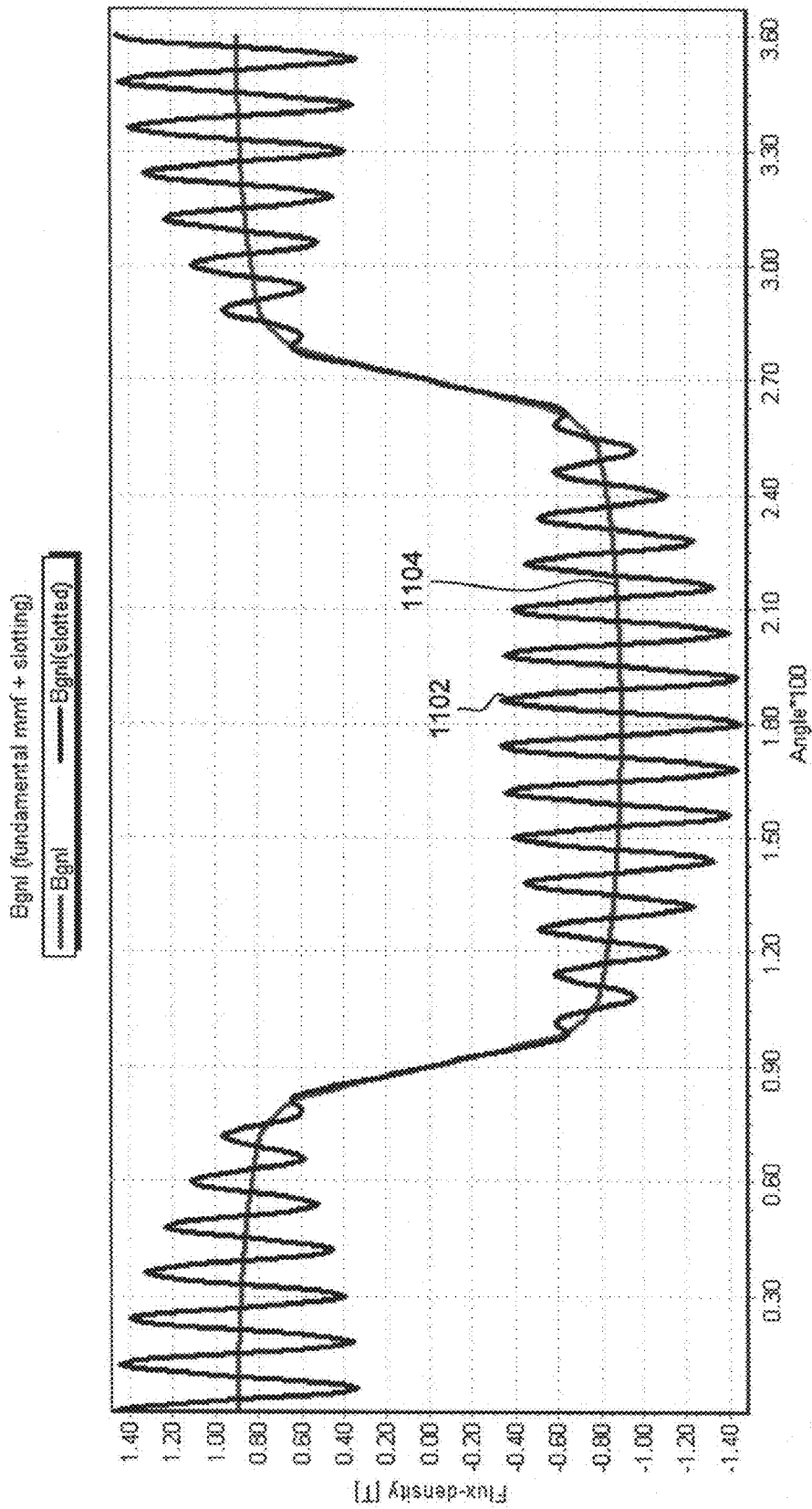
FIG. 11 is a diagram showing air gap flux density over 360 degrees for an improved motor, such as the one illustrated in FIG. 1A.
Figure 12:
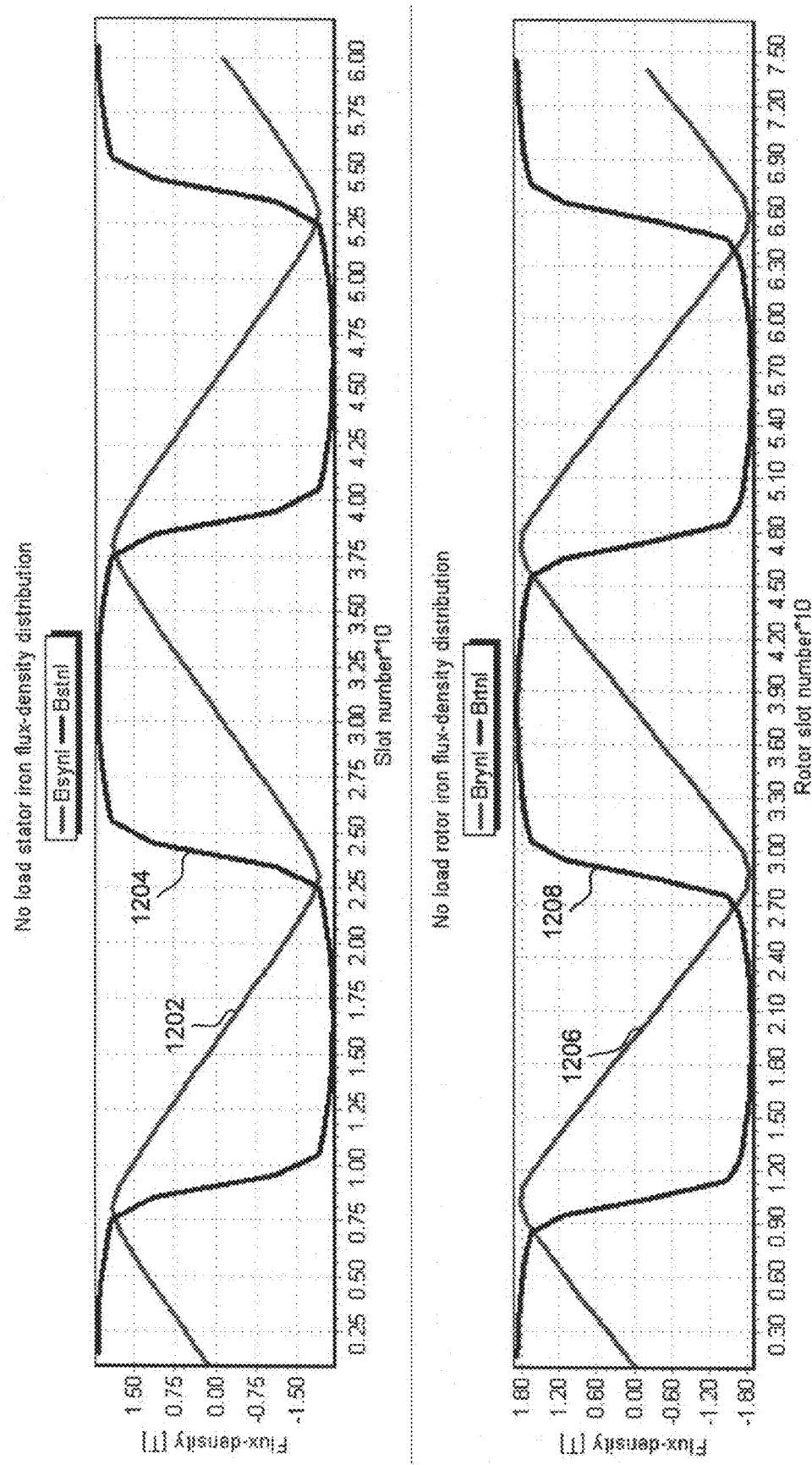
FIG. 12 shows stator yoke and tooth flux densities over a stator circumfluent of 60 slots, and rotor yoke and tooth flux densities over rotor circumfluent of 74 slots, for the motor illustrated in FIG. 11.

FIGS. 11 and 12 show flux densities for an improved induction motor embodiment. In FIG. 11, ripples 1102 are superimposed over a fundamental curve 1104. FIG. 12 shows, in an upper portion, flux density for a stator yoke 1202 and in the stator teeth 1204, and in a lower portion, flux density for a rotor yoke 1206 and for rotor teeth 1208. In FIGS. 11-12, the improved induction-motor embodiment uses a stator having 60 slots and a rotor having 74 slots (e.g., the embodiment of FIG. 1A), although other slot number combinations are possible.

Figure 13:
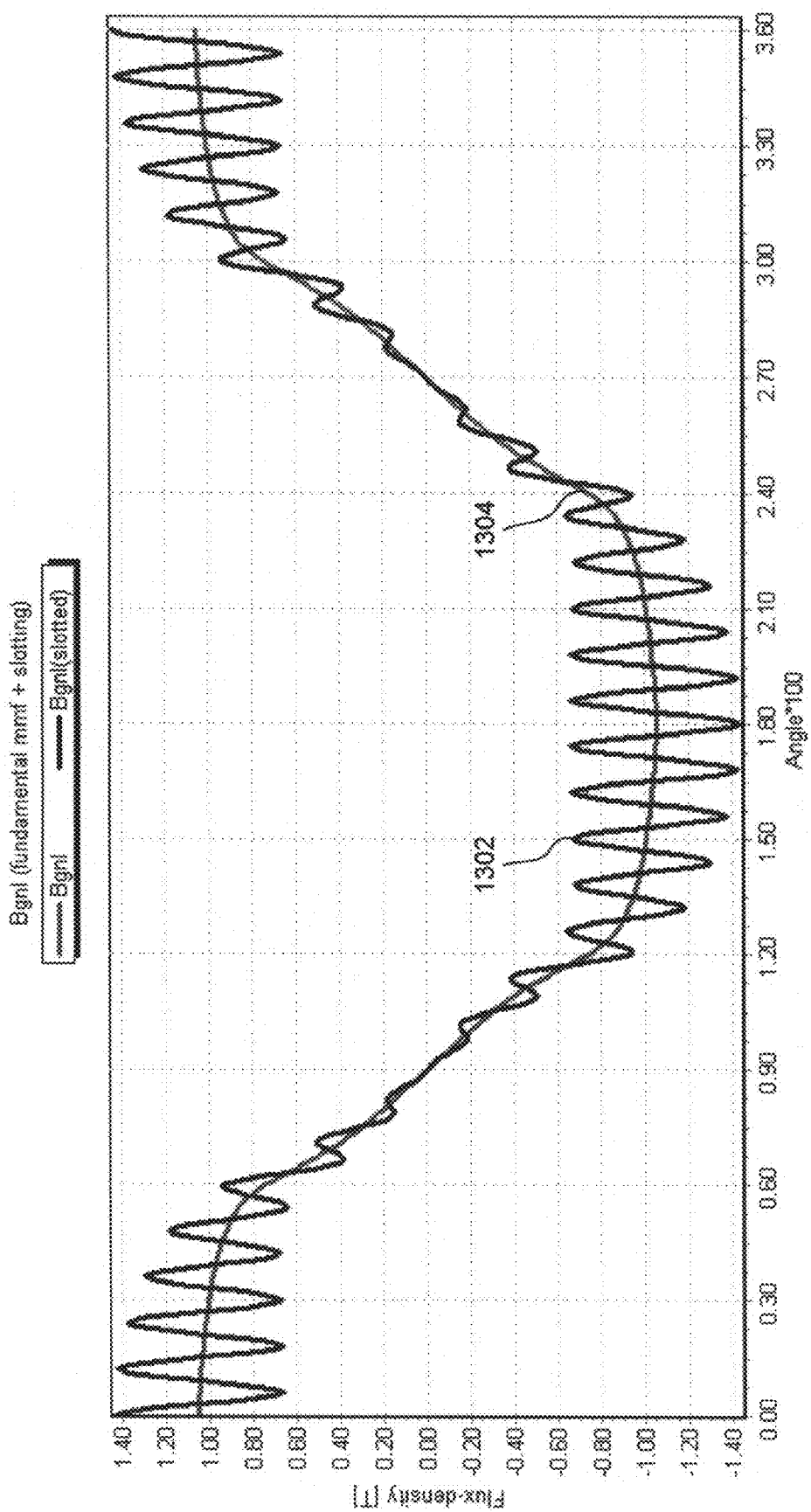
FIG. 13 shows flux densities for an improved induction motor embodiment, such as the embodiment illustrated in FIG. 20.
Figure 14:
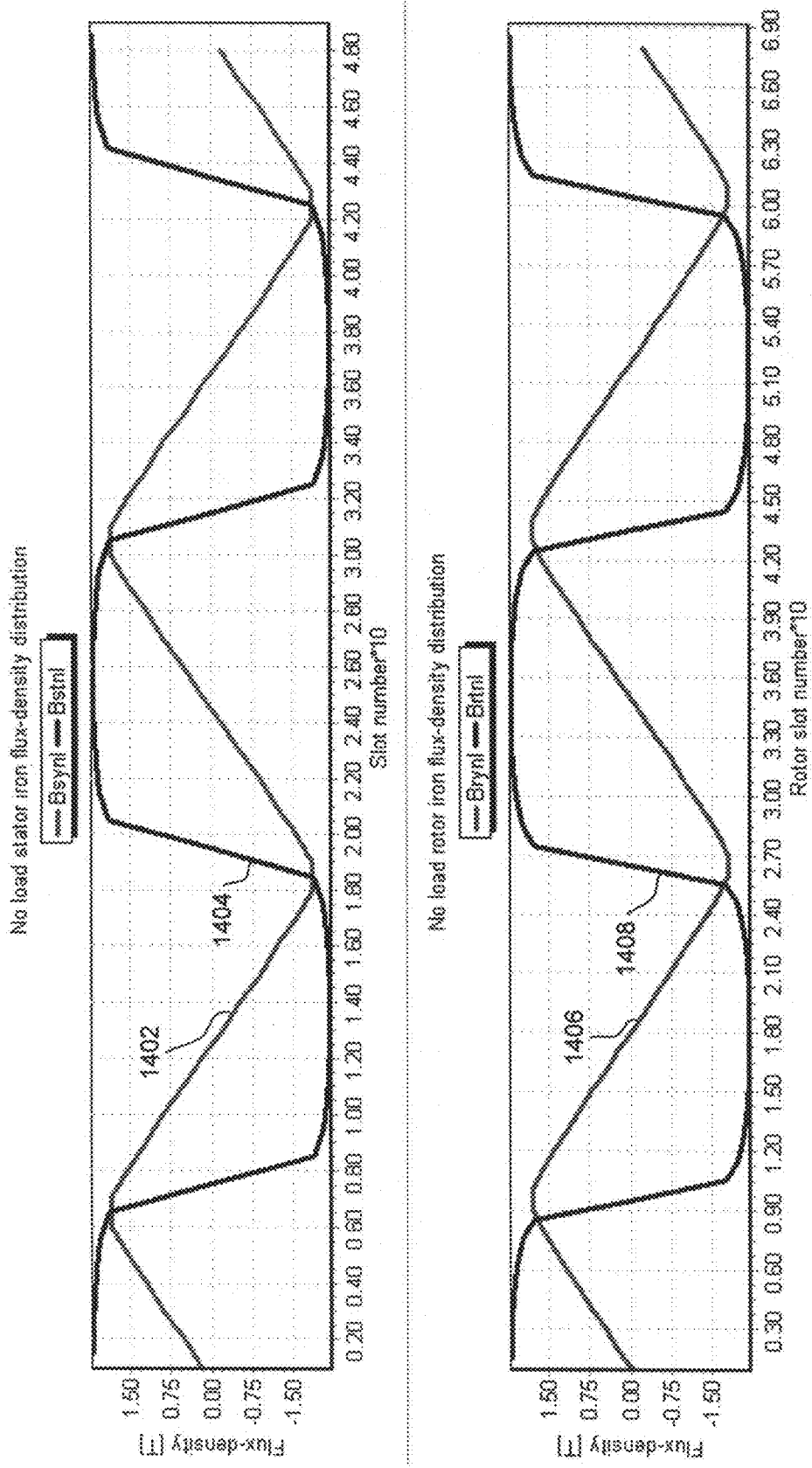
FIG. 14 is a diagram showing stator yoke and teeth flux densities over stator circumfluent of 48 slots and rotor yoke and teeth flux densities over rotor circumfluent of 68 slots, for the motor illustrated in FIG. 13.

FIG. 13 and FIG. 14 show flux densities for a further improved induction motor embodiment. FIG. 13 shows flux density ripples 1302 superimposed over a fundamental curve 1304 for an air gap. FIG. 14, shows, in an upper portion, flux density for a stator yoke 1402 and in the stator teeth 1404, and in a lower portion, flux density for a rotor yoke 1406 and for rotor teeth 1408. In FIGS. 13 and 14, the improved induction motor embodiment uses a stator having 48 slots and a rotor having 68 slots (e.g., the embodiment of FIG. 20).

For a given voltage and amperage, the torque capability of conventional motors is unfavorably limited by a lower pull-out torque and decreased air-gap flux linkage. Improved air-gap flux linkage is described above in associate with FIGS. 4-5. Pull-out torque is also known as breakdown torque, which is the maximum torque that can be obtained at a speed point and under the excitation limitations, i.e., the voltage and current limitations. The curve 1902 for the improved motor embodiment in FIG. 19A has a maximum in curve 1902 which represents the pull-out torque for the motor, for example.

FIG. 11 is a diagram showing air gap flux density over 360 electrical degrees for an improved motor. This motor performs better in EV applications than the conventional induction motor of FIGS. 9 and 10. The improved motor produces increased stator and air-gap flux linkages and increased air-gap flux density. This provides increased torque. The waveforms are not sinusoidal, instead taking a substantially square, trapezoidal shape. Across the air gap, both the peak and the RMS of the fundamental flux density are increased when compared to the curve in FIG. 9, showing a performance improvement of the improved motor of FIG. 11 when compared to the conventional design of FIG. 9.

FIG. 12 shows stator yoke and tooth flux densities over a stator circumfluent of 60 slots, and rotor yoke and tooth flux densities over rotor circumfluent of 74 slots. In FIG. 12, for the stator and rotor teeth, both the peak and the RMS of the flux density are increased. The substantially square trapezoidal MMF pattern, produced in some examples by using a full-pitch stator winding placement discussed in association with FIG. 16, generates a substantially square or trapezoidal flux density distribution. Some embodiments have two or more layers of coils in a single slot. An example of a coil that has two layers is illustrated in FIG. 2.

FIGS. 9-14 refer to embodiments in which a motor has four poles per phase. For the improved motor embodiments disclosed in FIGS. 11-14, most of the teeth in each pole are driven to nearly deep saturation, i.e., increasing the MMF produced by the current through the windings surrounding the teeth would not increase the flux density appreciably. The saturation level of the several central teeth of a particular pole is similarly high, unlike the conventional motor which has a more sinusoidal gradient. The saturation level of most or all the teeth of a particular pole is deep, and the saturation level of the outside teeth is less than that of the central teeth. For example, each of the teeth 1101-1116 and 1181-1190 (see FIG. 1C) are at or above approximately 1.5 Tesla. Those teeth are in full saturation, in various embodiments. In some embodiments, the saturation level is above 2.0 Tesla. In one example, simultaneous saturation of all the stator and rotor teeth of the entire motor occurs, in which where most of the teeth are in deep saturation while the stator and rotor yokes are only lightly saturated or not saturated.

FIG. 12 illustrates flux densities for an improved motor having 60 stator slots and 74 rotor slots. The flux densities illustrated are a snapshot of what is measured as a point of reference travels 360 degrees around the stator measuring flux density. As is illustrated in FIG. 1C, many of the stator teeth and rotor teeth are in deep saturation. In the illustration, they have a flux density of about 2.0 Tesla. The no-load stator tooth flux-density is shaped like a substantially square wave, while the no-load stator yoke flux density is shaped like a saw tooth. The stator yoke and the rotor yoke have a flux density ranging from not saturated to lightly saturated to a very limited region of deep saturation.

The improved induction motor embodiments disclosed here are able to show characteristics of a permanent-magnet brushless DC ("BLDC") motor with salient stator and rotor poles and with substantially square-wave current excitations. For example, the improved motors disclosed here can mimic BLDC motors at high-torque operating points. The saliency of the substantially square, trapezoidal flux density is obtained with distributed stator windings, instead of with the concentrated stator windings of a BLDC. In contrast to BLDC motors, the embodiments disclosed here produce torque from the interaction between the first fundamental sinusoidal components of the traveling air-gap flux distribution and the first fundamental sinusoidal components of the traveling rotor MMF provided by the induced rotor bar currents.

The forward traveling air-gap flux distribution is the combined result of the forward traveling stator MMF and the forward traveling rotor MMF (the latter lags the former by the slip speed), while the forward traveling stator MMF is the combined result of the varying stator drive current and spatially distributed stator windings of multiple phases. Compared to the conventional motor, the non-sinusoidal wave flux density distribution results in higher fundamental sinusoidal components than a conventional design. Additionally, the non-sinusoidal wave MMF distribution can result in higher fundamental sinusoidal components than a conventional design.

Compared to a conventional motor fitted with the same number of teeth, the improved induction motor embodiments disclosed here carry flux across the air gap using more stator teeth and more rotor teeth than a conventional design does. The deep tooth saturation for the main magnetizing flux paths reduces both stator and rotor leakage inductances while allowing higher air gap flux density. This improves pull-out torque and constant-power range as is discussed here.

Due to the deep saturation level of the stator and rotor teeth, some embodiments maintain the saturation levels of the bulk of the stator and the rotor yokes at a low level to reduce the need for high magnetization current under varying load conditions. This tends to keep the motor power factor and efficiency at a high level. Some embodiments match the saturation levels and the above saliency effect on both the stator and the rotor to provide a smooth torque production and minimal low order torque pulsations.

The improved saturation level management is possible through the improvement of the plate geometries, winding patterns and excitation control. These characteristics are discussed in association with FIGS. 1-3. Wide stator slots and narrow stator teeth allow for distributed and wide-span deep tooth saturation. They also provide increased winding areas so that a higher number of turns can be used. This increases the MMF which increases the flux density through the stator teeth to the air gap. This increase generally takes place at speeds below those where field weakening begins. Short stator and rotor teeth (as compared to yoke thickness), most of which are driven to deep saturation in peak torque condition, require reduced magnetization current. The need for magnetization current is further reduced by using thicker stator and rotor yokes that are less saturated. Short and narrow stator and rotor teeth also reduce stator and rotor leakage fluxes which increase pull-out torque (discussed, e.g., in association with FIG. 5).

A high number of stator teeth allows for the distributed wide-span deep saturation in the stator teeth. This creates a substantially square-wave like stator-tooth and air-gap flux density distribution with high fundamental levels as shown above. A higher number of rotor teeth allows for the matching of deep saturation of the stator and rotor teeth, as well as allowing a similar distributed wide-span deep saturation in the rotor teeth to create the substantially square-wave like rotor teeth flux density distribution with high fundamental levels. A large stator outer diameter to axial stack length ratio, such as a ratio of 2:1, provides more room to increase stator slot area, to increase MMF and to increase stator and rotor yoke thickness. This also allows for high stator and rotor tooth and slot numbers without adding manufacturing difficulty. This ratio provides for a shorter plate axial stack length and allows for a limited motor volume and weight while increasing motor outer diameter. This can lower the stator and rotor resistances and leakage inductances. Stator and rotor tooth widths that are sized similarly to each other allow for improved air-gap flux density levels and provide the torque-producing effect of a high air-gap flux density. These tooth sizes also reduce rotor-bar leakage fluxes.

One example includes 60 stator slots and 74 rotor slots. In this example, the torque ripple is reduced. Radial force and stray load losses due to slot harmonics and winding harmonics are reduced largely due to the ability to match the rotor tooth width to the stator tooth width and to match the saturation levels of the rotor teeth and the stator teeth. The motor retains other general benefits of high tooth numbers, such as lower resistances and leakage inductances. As described earlier, a high number of stator and rotor teeth allow the distributed multiple teeth saturation and a high fundamental flux density distribution.

A stator outer diameter (OD) to stack length ratio of at least 2:1 is desirable, as shown in FIG. 1. Compared to longer stack motors the benefits are reduced stator and rotor resistances and leakage inductances, as they are all proportional to the stack length. End-turn and end-ring effects are insignificant until the stator OD to stack length ratio is substantially increased. The shorter stack's compromise in air-gap flux linkage is compensated for by an increase in flux linkage due to one or more of the features depicted herein as increasing flux linkage. Its compromise in thermal contact area is compensated by larger stator and rotor OD. The increased stator slot area reduces stator current density and increases the winding-to-iron contact area. This can reduce thermal resistance and provide an improved thermal performance (i.e., reduce heating in operation). Alternatively, short-stack motors include motors with a stator inner diameter (ID) to stack length ratio of greater than 1. Other aspects of the improved embodiments may be varied to provide further benefits. For example, the size of the slot openings of the stator and rotor slots can be adjusted to reduce torque pulsations and leakage fluxes.

As set out above, a reduced rotor outer diameter and increased stator inner diameter provides a larger stator slot area. The stator MMF can be increased when compared to a conventional motor with the same winding pattern as the conventional motor. This further increases the air gap flux density level, as well as reducing the slot ripple harmonic magnitude and rotor inertia.

FIG. 13 shows an embodiment which has a fundamental flux density peak that is increased, when compared to FIG. 11, from 0.90 Tesla to 1.05 Tesla. The flux density ripple maximum magnitude has reduced from 1.10 Tesla to 0.80 Tesla, as compared to the configuration set out in FIG. 11.

FIG. 14 is a diagram showing the above embodiment with stator yoke and teeth flux densities over a stator circumfluent of 48 slots and rotor yoke and teeth flux densities over a rotor circumfluent of 68 slots. The figure shows a motor with improved, deep, identical-level saturation of the stator and rotor teeth, and with improved, shallower, identical-level saturation of the stator and rotor yokes.

FIG. 15 is a diagram showing the total MMF 1502 of a phase of an example 4-pole configuration with short-pitch winding placement, with accumulated MMF of all coils and turns of the phase over the 60 stator slots. The short-pitch winding configuration is disclosed in table 1, as follows:

| Slot Number | Top | Bottom |
| --- | --- | --- |
| 1 | A | C- |
| 2 | A | C- |
| 3 | A | C- |
| 4 | A | C- |
| 5 | A | C- |
| 6 | C- | B |
| 7 | C- | B |
| 8 | C- | B |
| 9 | C- | B |
| 10 | C- | B |
| 11 | B | A- |
| 12 | B | A- |
| 13 | B | A- |
| 14 | B | A- |
| 15 | B | A- |
| 16 | A- | C |
| 17 | A- | C |
| 18 | A- | C |
| 19 | A- | C |
| 20 | A- | C |
| 21 | C | B- |
| 22 | C | B- |
| 23 | C | B- |
| 24 | C | B- |
| 25 | C | B- |
| 26 | B- | A |
| 27 | B- | A |
| 28 | B- | A |
| 29 | B- | A |
| 30 | B- | A |
| 31 | A | C- |
| 32 | A | C- |
| 33 | A | C- |
| 34 | A | C- |
| 35 | A | C- |
| 36 | C- | B |
| 37 | C- | B |
| 38 | C- | B |
| 39 | C- | B |
| 40 | C- | B |
| 41 | B | A- |
| 42 | B | A- |
| 43 | B | A- |
| 44 | B | A- |
| 45 | B | A- |
| 46 | A- | C |
| 47 | A- | C |
| 48 | A- | C |
| 49 | A- | C |
| 50 | A- | C |
| 51 | C | B- |
| 52 | C | B- |
| 53 | C | B- |
| 54 | C | B- |
| 55 | C | B- |
| 56 | B- | A |
| 57 | B- | A |
| 58 | B- | A |
| 59 | B- | A |
| 60 | B- | A |

In table 1 and table 2 (below), a minus sign indicates current in a slot in a coil extending in an opposite direction to coils without a minus sign. A complete coil travels through two slots with opposite signs and completes a current loop. Coils can be connected in serial or parallel or combination. Table 1 shows a 4-pole motor with 4 groups of coils and four current loops for each phase, resulting in 4 maximum (2 positive, 2 negative) peaks of the 3-phase combined MMF in FIG. 15.

The left of the table includes the slot numbers for a 60 slot stator. A two-layer winding pattern is shown, including top layer (occupying top half of a slot) and bottom layer (occupying bottom half of a slot). This embodiment has 60 stator slots. There are 4 poles per phase. There are 5 coils per pole. The coils each span 10 teeth. Coil 1 spans slots 1 to 11, and coil 5 spans slots 5 to 15. The short-pitch winding configuration provides a near sinusoidal MMF which is an efficient method to excite the induction motor magnetic paths to produce a near sinusoidal flux density distribution such as the one illustrated in FIG. 9.

FIG. 16 is a diagram showing the total MMF 1602 of a phase of an example 4-pole design with full-pitch winding placement, with accumulated MMF of all coils and turns of the phase over the 60 stator slots. The full-pitch winding configuration is disclosed in table 2, as follows:

| Slot Number | Top | Bottom |
| --- | --- | --- |
| 1 | A | A |
| 2 | A | A |
| 3 | A | A |
| 4 | A | A |
| 5 | A | A |

-continued

| Slot Number | Top | Bottom |
| --- | --- | --- |
| 6 | C- | C- |
| 7 | C- | C- |
| 8 | C- | C- |
| 9 | C- | C- |
| 10 | C- | C- |
| 11 | B | B |
| 12 | B | B |
| 13 | B | B |
| 14 | B | B |
| 15 | B | B |
| 16 | A- | A- |
| 17 | A- | A- |
| 18 | A- | A- |
| 19 | A- | A- |
| 20 | A- | A- |
| 21 | C | C |
| 22 | C | C |
| 23 | C | C |
| 24 | C | C |
| 25 | C | C |
| 26 | B- | B- |
| 27 | B- | B- |
| 28 | B- | B- |
| 29 | B- | B- |
| 30 | B- | B- |
| 31 | A | A |
| 32 | A | A |
| 33 | A | A |
| 34 | A | A |
| 35 | A | A |
| 36 | C- | C- |
| 37 | C- | C- |
| 38 | C- | C- |
| 39 | C- | C- |
| 40 | C- | C- |
| 41 | B | B |
| 42 | B | B |
| 43 | B | B |
| 44 | B | B |
| 45 | B | B |
| 46 | A- | A- |
| 47 | A- | A- |
| 48 | A- | A- |
| 49 | A- | A- |
| 50 | A- | A- |
| 51 | C | C |
| 52 | C | C |
| 53 | C | C |
| 54 | C | C |
| 55 | C | C |
| 56 | B- | B- |
| 57 | B- | B- |
| 58 | B- | B- |
| 59 | B- | B- |
| 60 | B- | B- |

Table 2 shows a 4-pole motor with 4 groups of coils and four current loops for each phase, resulting in 4 maximum (2 positive, 2 negative) peaks of the 3-phase combined MMF in and FIG. 16. This embodiment has 60 stator slots. There are 4 poles per phase. There are 5 coils per pole. The coils each span 15 teeth. Coil 1 spans slots 1 to 16, and coil 5 spans slots 5 to 20, for example. The full-pitch winding configuration provides a non-sinusoidal or substantially square, trapezoidal MMF that contains lower order harmonics which is an efficient method to excite the induction motor magnetic paths to produce a substantially square, trapezoidal flux density distribution, such as the ones illustrated in FIGS. 11-14. Alternative winding configurations are also contemplated, including those having coils spanning between 10 and 15 slots.

Winding patterns allowing more substantially square-wave trapezoidal shaped MMF provide increased torque. For example, the winding pattern of FIG. 16 provides more torque than that of FIG. 15. These are more efficient in producing a substantially square-wave or trapezoidal shaped flux density distribution analogous to that of BLDC motors. For a more smooth torque production at lower torque operating points, a more sinusoidal MMF is used. This also provides a more sinusoidal flux density distribution. In some examples, a substantially square-wave like or trapezoidal shaped MMF is provided by using at full-pitch 2 or more layers of same-phase coils per slot and by using a high number of turns per coil. Higher numbers of poles can also allow for a substantially square-wave MMF.

Figure 17A:
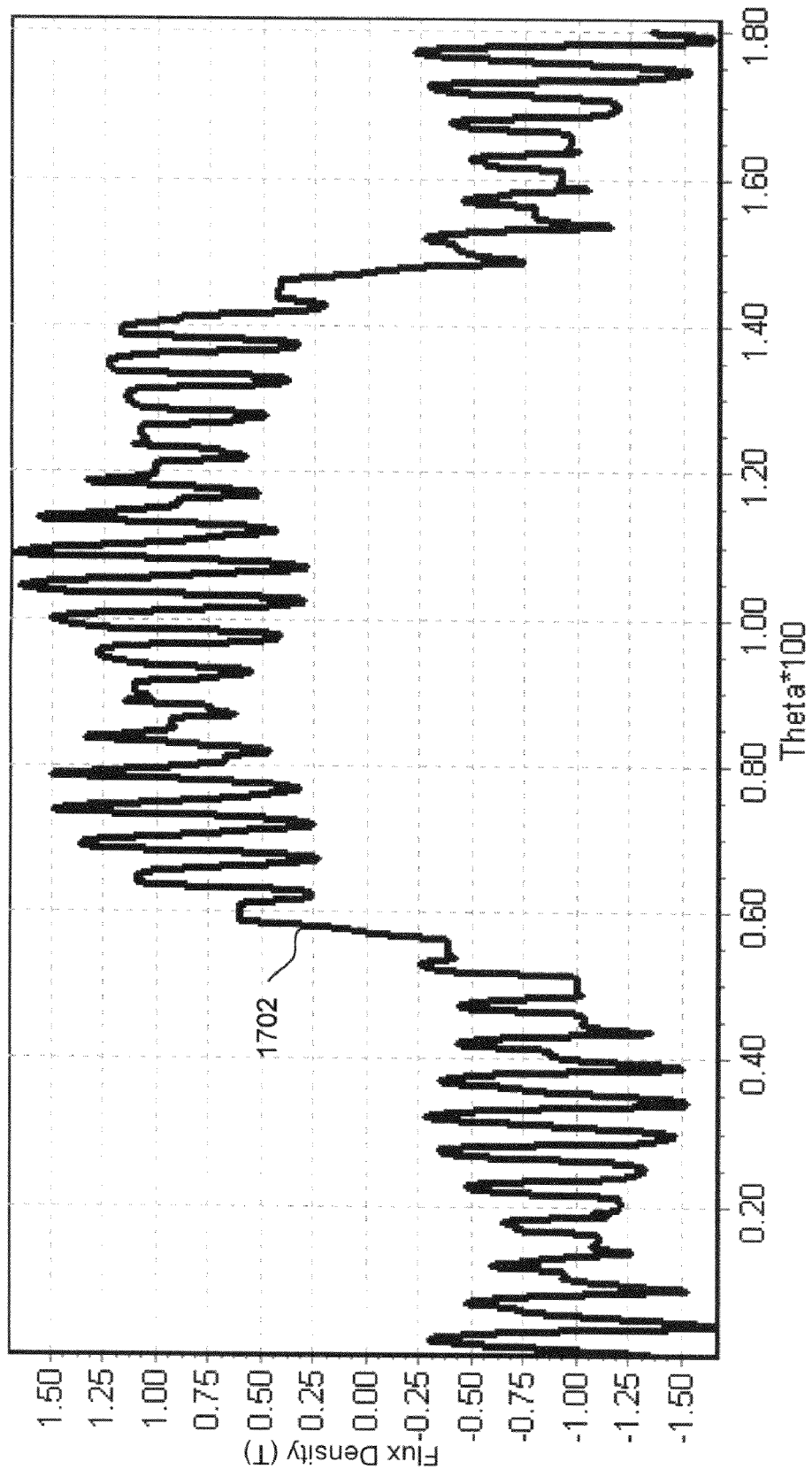
FIG. 17A shows a flux density along the middle of the air-gap, according to some embodiments.
Figure 17B:
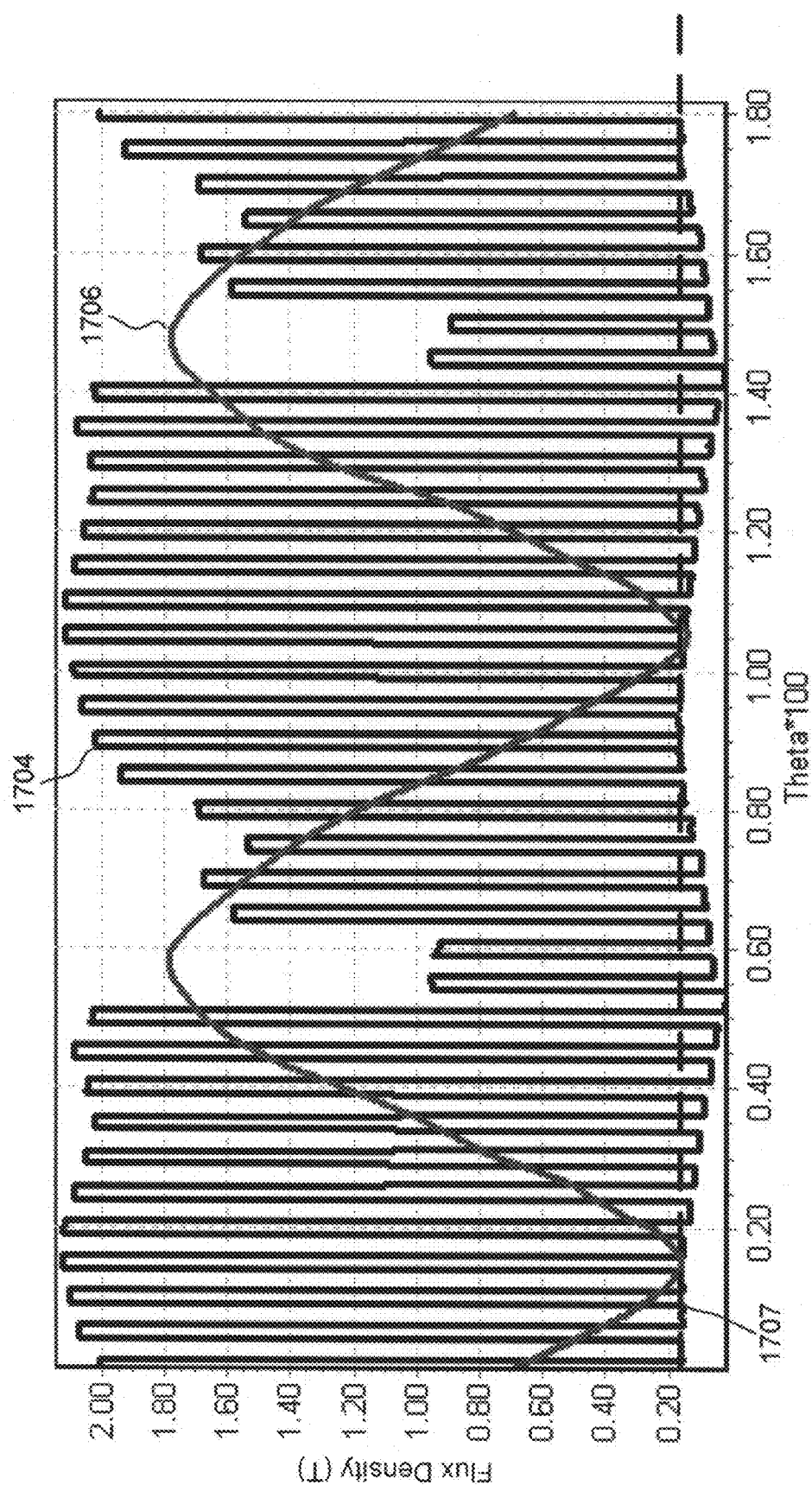
FIG. 17B shows flux density across the stator teeth and flux density across the stator yoke, according to some embodiments.
Figure 17C:
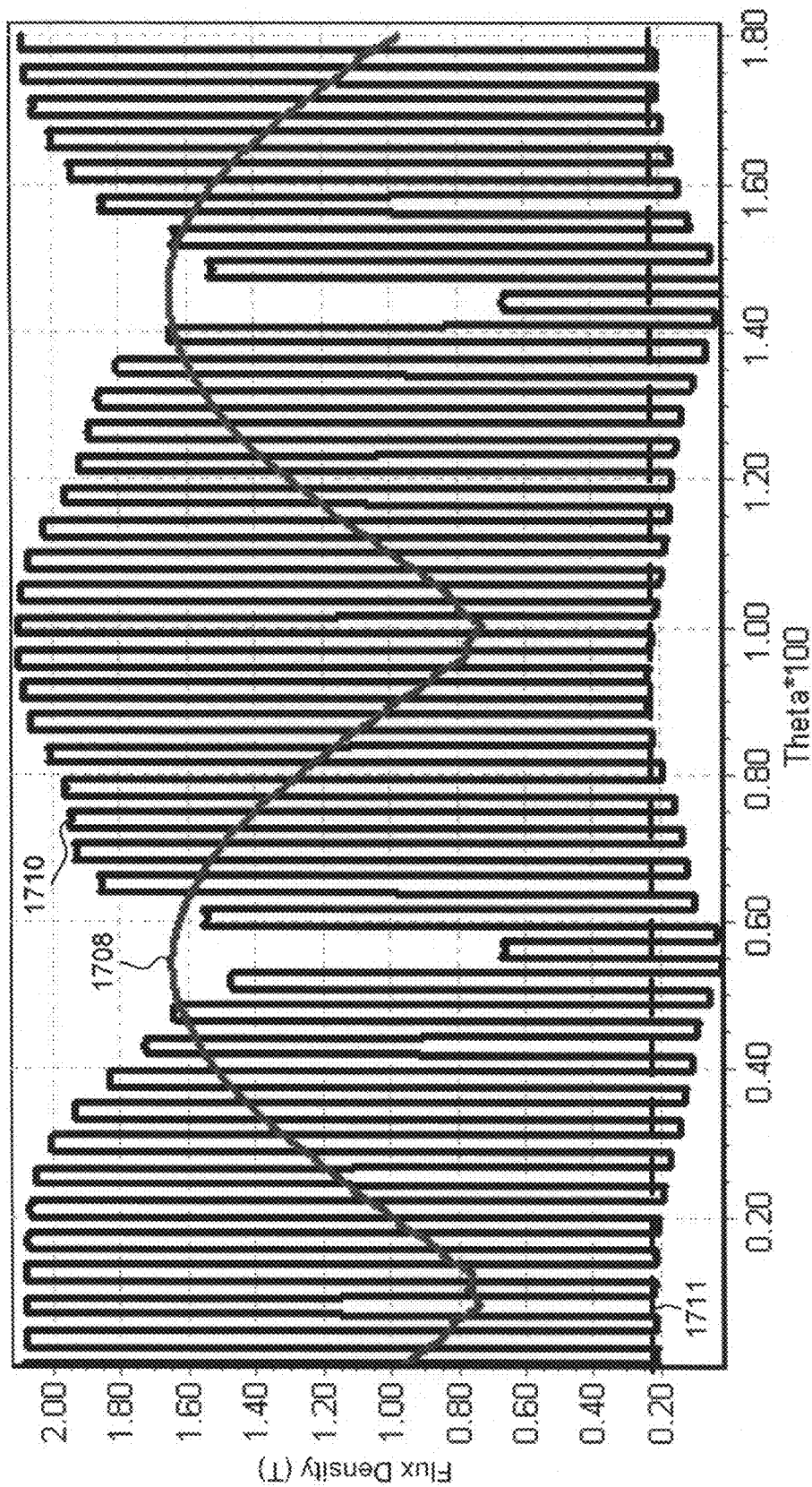
FIG. 17C shows flux density across the rotor teeth and flux density across the rotor yoke, according to some embodiments.
Figure 18A:
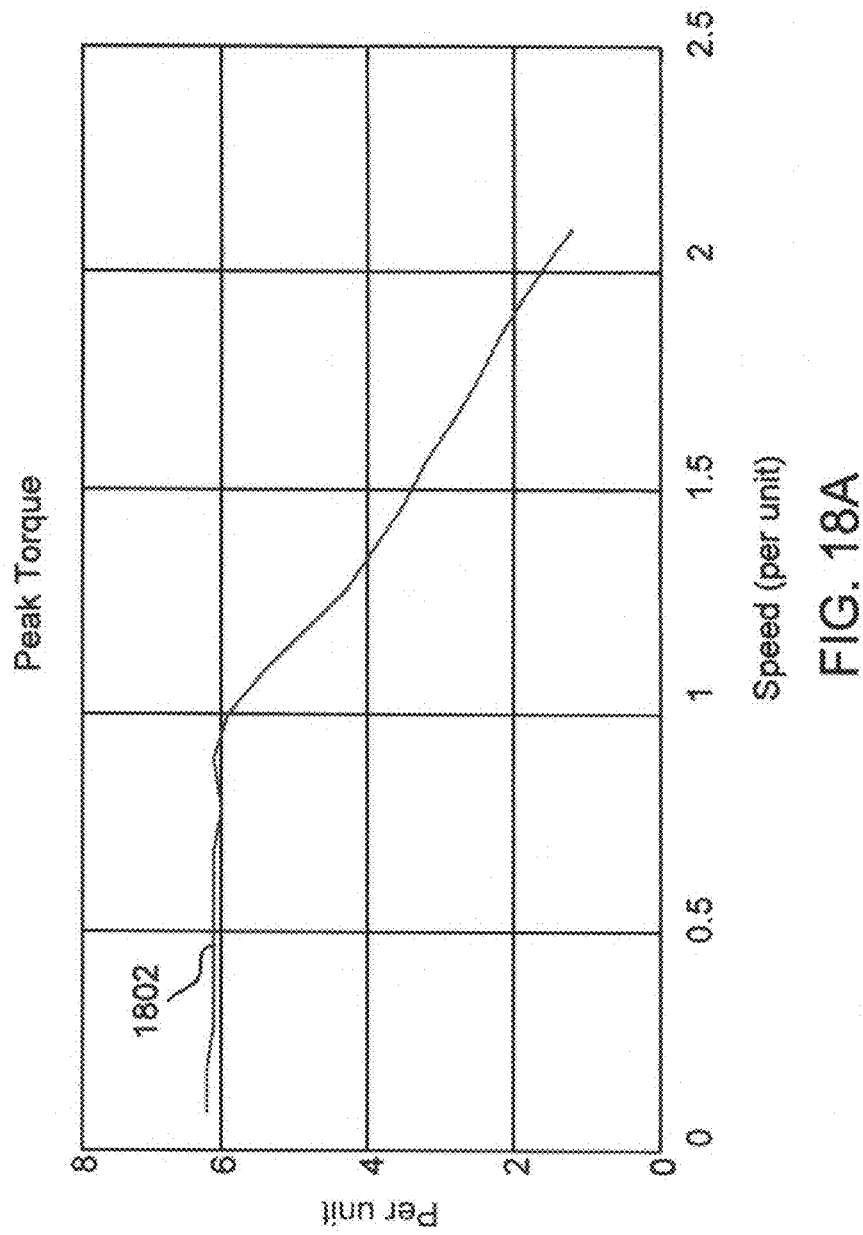
FIG. 18A shows peak torque over a speed range, according to some embodiments.
Figure 18B:
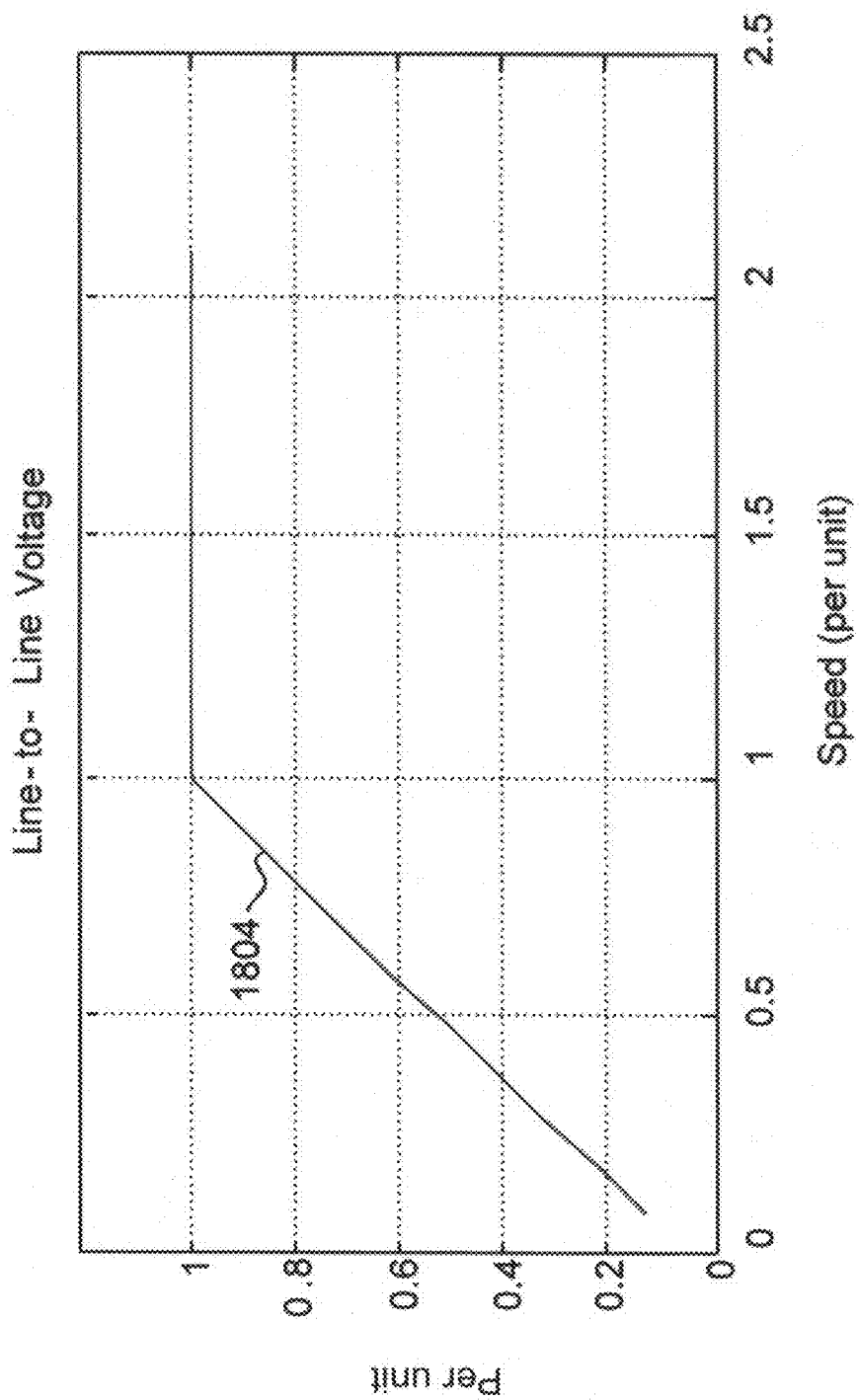
FIG. 18B shows voltage over a speed range, according to some embodiments.
Figure 18C:
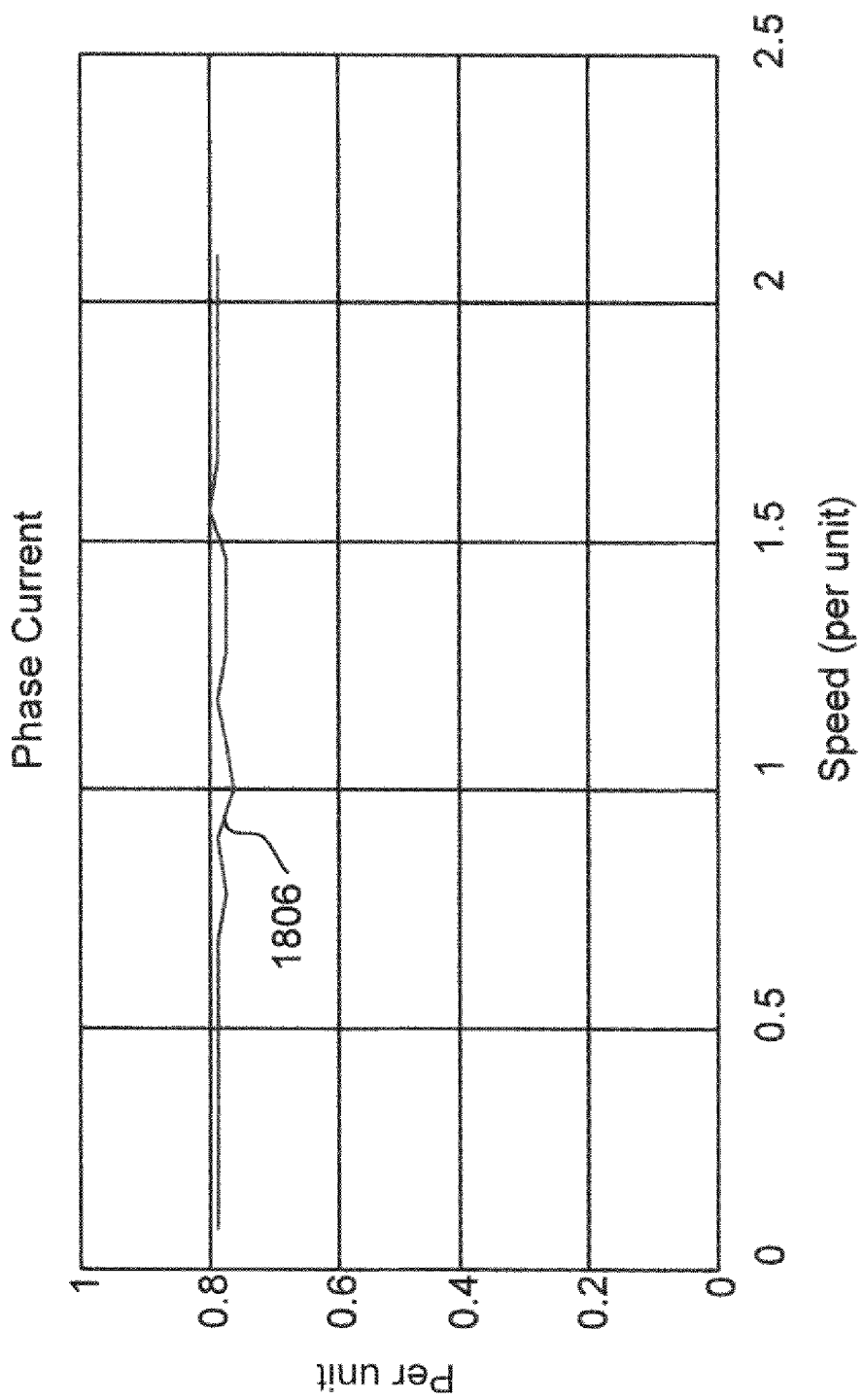
FIG. 18C shows current over a speed range, according to some embodiments.
Figure 18D:
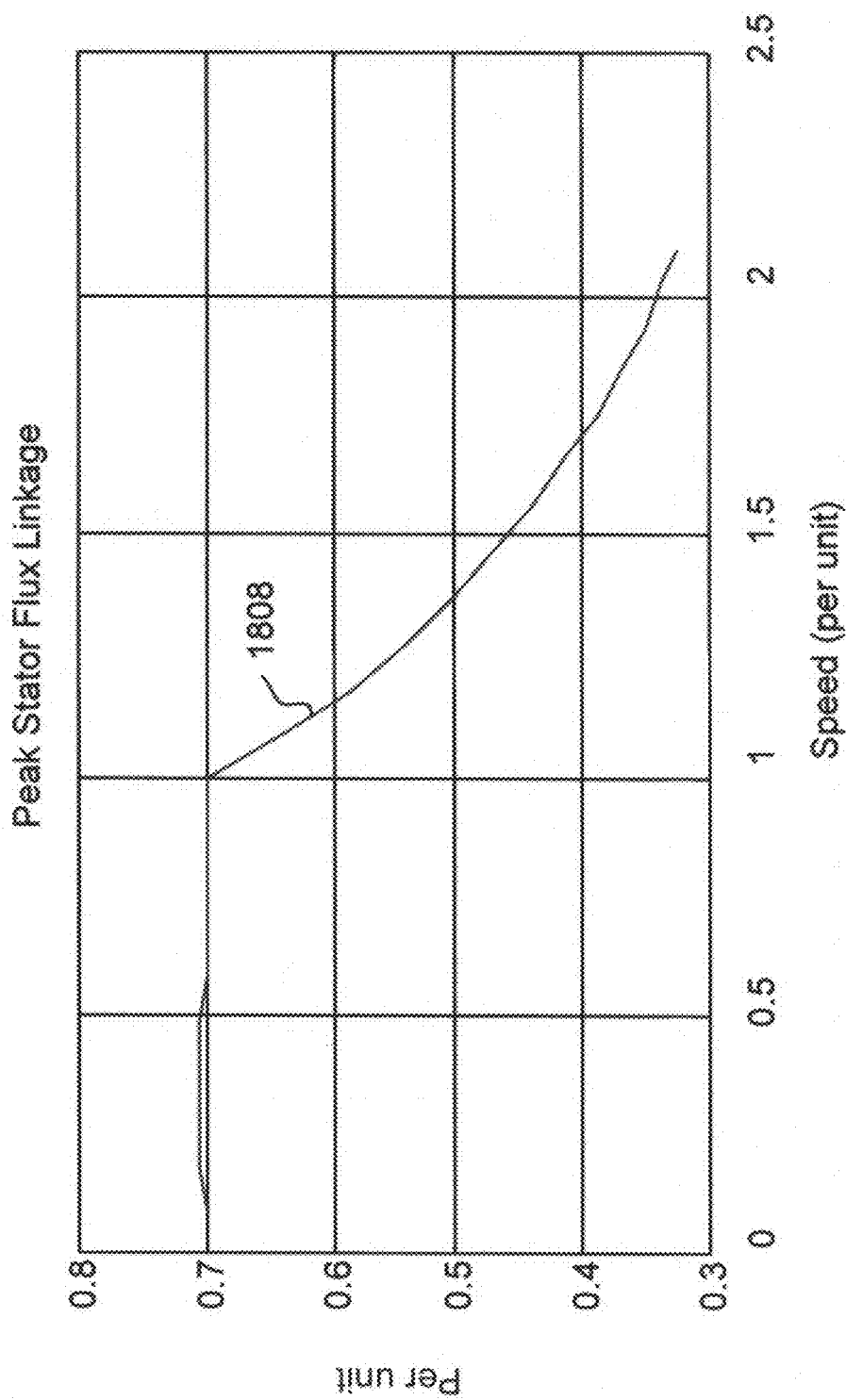
FIG. 18D shows stator flux linkage over a speed range, according to some embodiments.

FIGS. 17A-17C show a finite-element analysis model of flux density magnitude at peak torque, the flux density indicated across 180 mechanical degrees or ½ of the induction motor, according to embodiments of the present subject matter. The charts represent 1 pole pair of a 4-pole motor. FIG. 17A shows a flux density 1702 along the middle of the airgap. FIG. 17B shows flux density across the stator teeth 1704 and flux density across the stator yoke 1706. FIG. 17C shows flux density across the rotor teeth 1710 and flux density across the rotor yoke 1708.

The leakage flux densities 1707, 1710 through the stator and rotor slots is shown to be under 0.3 Tesla in this example, as indicated by the minimum pulses of the non-smooth pulsed curves of FIG. 17B and FIG. 17C, for the stator slots and the rotor slots, respectively. The leakage flux density level is lower than in a conventional motor due to the higher and more prevalent saturation of the stator and rotor teeth which are also part of the leakage flux paths. The stator and rotor leakage flux can saturate in the high torque operating points, resulting in saturated and reduced stator and rotor leakage inductances. In the improved motor, by distributing the leakage fluxes as well as reducing the stack length, the total leakage flux linkages and the leakage inductances of the stator and rotor are further reduced, resulting in an increased pull-out torque.

FIGS. 18A-18D show peak torque 1802, voltage 1804, current 1806 and stator flux linkage 1808 over a speed range, for embodiments of the present subject matter. FIGS. 19A-19B show variable-frequency control and constant flux 1902 range up to the base speed, with a field weakening range, for embodiments of the present subject matter. The base speed is shown to be at 1 p.u. (per unit). The base speed is the speed around which the peak torque 1902 starts to decrease (as can be seen in FIG. 19A) and the peak stator flux linkage 1904 starts to decrease (as can be seen in FIG. 19B). The improved induction motors may provide a 6:1 or greater peak/continuous torque ratio. They also provide a wide constant-peak power range that is extended from the base speed to more than twice the base speed. Further, they provide a wide field-weakening range that is extended from the base speed to more than twice the base speed. These effects are provided under various constraints, such as limited available maximum current and voltage. The improved induction motors have an improved power factor and improved efficiency when compared to a conventional motor. Further, they perform without unwanted increases in motor weight and size.

Below the base speed, the peak flux linkage level is kept under a limit in deep saturation. This is to obtain an improved torque/current ratio. This is possible with the adjustment of the drive voltage as shown in the example voltage profile in FIGS. 18A-D. At less than peak torque operating points below the base speed, the flux linkage level can be adjusted by adjusting the drive voltage and current, achieving the demanded torque while meeting other performance criteria such as desired efficiency or reduced drive current. The adjustment of the flux linkage allows for the operation of the motor in substantially reduced saturation, and the flux density distribution will now become more sinusoidal if the winding pattern is sinusoidal (which is not necessary as is discussed above).

FIGS. 19A-B illustrate a variable frequency control. At speeds above the base speed of 1 p.u., the drive voltage is limited and the flux linkage is weakened. The pull-out torque, which is the maximum torque in each of the single frequency torque-speed curves, becomes lower as the speed increases. It is beneficial to provide a high pull-out torque, as this increases the vehicle operator's perception that torque is available for acceleration. This can be done through reducing both the stator and rotor leakage fluxes, and hence leakage inductances. The short and narrow stator and rotor teeth of the improved induction motor embodiments provide this advantage by providing less steel area for the leakage flux paths. In addition, the deep tooth saturation further reduces both stator and rotor leakage inductances while allowing higher air gap flux density. This improves pull-out torque. Increasing the pull-out torque also allows the full utilization of the peak inverter power rating by providing a wide constant-power range.

FIG. 20 shows an axial view of an improved induction motor 2000, according to various embodiments. The diagram is simplified for the sake of explanation, as windings and other components are omitted. The general characteristics of the geometry when compared to a conventional induction motor include, but are not limited to, one or more of a radial air gap increased over the air gap size of conventional motors, a shorter axial stack length, wider stator slots, narrower stator teeth, narrower and shorter rotor teeth, a stator yoke that is thicker than the stator's tooth length and much thicker than the tooth width, a rotor yoke that is thicker than the rotor's tooth length and much thicker than the rotor's tooth width, an increased number of stator slots per pole per phase, and an increased number of rotor slots.

A rotor 2002 is encircled by a stator 2004. There is an air gap 2006 between them. The air gap 2006 between the stator 2004 and rotor 2002 is larger than those used in conventional designs. In some embodiments, it is at least 0.5 mm, although the present subject matter is not so limited. In various embodiments, the air gap size is selected to obtain certain levels of the magnetizing inductance and the leakage inductances, as disclosed herein (e.g., FIGS. 4-8 show the embodiments of FIG. 1A compared to a conventional design). The air gap 2006 additionally has an effect on the saturation levels and harmonic levels of the magnetic flux proximal the air gap. A shaft 2008 is coupled to the rotor 2002. The shaft 2008 can be coupled to downstream devices, including but not limited to an axle, a gearbox and the like.

The rotor 2002 includes a plurality of rotor teeth 2010. Between each tooth and the tooth next to it (i.e., between each tooth pair), is a rotor slot 2012. The teeth define the slots between them. In this embodiment, the rotor slots are closed. The rotor also has a rotor yoke 2014. The stator 2004 includes a stator yoke 2016, a plurality of stator teeth 2018, and stator slots 2020 that are defined by the stator teeth 2018. In various embodiments, the teeth and the yoke of the rotor are continuous blocks of material, i.e. monolithic. For example, in some embodiments the rotor is comprised of a stack of plates electrically insulated from one another, and each of the plates is stamped or otherwise excised from a single billet.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. Apparatus, comprising:
   a stator defining a stator bore, the stator comprising
      a stator yoke having a stator yoke thickness, and
      a plurality of stator teeth, the teeth having a common length, with each of the stator teeth including a stator tooth center portion that extends from a stator tooth bottom portion proximal the yoke to a stator tooth tip portion, with adjacent stator teeth defining a stator slot between them, each stator slot having a stator slot bottom that extends along a stator slot bottom length,
      wherein the center portion has a stator tooth width that is less than or equal to one half the stator slot bottom length, the stator tooth width also being smaller than a stator slot opening width distance between adjacent stator tooth center portions, wherein a ratio of stator yoke thickness to stator tooth width is at least 5:1; and
   a rotor mounted in the bore to rotate.

2. The apparatus of claim 1,
   wherein a ratio of rotor yoke thickness to rotor tooth width is at least 5:1.

3. The apparatus of claim 1, wherein a sum of the stator yoke thickness and the stator tooth length approximately equals a sum of the rotor yoke thickness and a rotor tooth length that extends radially away from the rotor yoke.

4. The apparatus of claim 1, wherein the rotor and stator have plate means for driving most of the stator teeth of a pole and most of the rotor teeth of the pole into deep magnetic saturation simultaneously.

5. The apparatus of claim 1, wherein the rotor and stator plates are adapted to simultaneously put most of the teeth of the rotor and most of the teeth of the stator into approximately equal levels of deep magnetic saturation, with the rotor and the stator yokes being in at most a light magnetic saturation that is less than a full magnetic saturation.

6. The apparatus of claim 1,
   wherein the rotor has a plurality of rotor teeth, with each of the rotor teeth having a rotor tooth center portion that extends from a rotor tooth bottom portion proximal the rotor yoke to a rotor tooth tip portion, the rotor center portion having a rotor tooth width, and
   wherein a ratio between the rotor tooth width and the stator tooth width is between 3:4 and 4:3.

7. The apparatus of claim 6, wherein a ratio between the rotor tooth width and the stator tooth width is approximately 1:1.

8. The apparatus of claim 1, wherein the stator is generally circular with an inner diameter greater than an axial stack length of the stator, and
   wherein the air gap distance between the circular stator and the circular rotor is at least 0.5 mm.

9. Apparatus, comprising:
   a stator defining a stator bore, the stator comprising
      a stator yoke having a stator yoke thickness, and
      stator teeth, the teeth having a common stator tooth width,
      wherein the ratio of stator yoke thickness to stator tooth width is at least 5:1; and
   a rotor mounted in the bore to rotate, the rotor comprising
      a rotor yoke having a rotor yoke thickness, and
      rotor teeth, the rotor teeth each having a rotor tooth width,
      wherein the ratio of rotor yoke thickness to rotor tooth width is at least 5:1.

10. The apparatus of claim 9, wherein a sum of the stator yoke thickness and the stator tooth length approximately equals a sum of the rotor yoke thickness and the rotor tooth length.

11. The apparatus of claim 9, wherein the stator has at least four teeth per pole per phase.

12. The apparatus of claim 11, wherein the stator has 60 teeth in total and the rotor has 74 teeth in total.

13. The apparatus of claim 11, wherein the rotor and stator have plates, the plates of the rotor and the stator being adapted to drive at least two stator teeth into a deep magnetic saturation simultaneously and is adapted to drive at least two rotor teeth into the deep magnetic saturation simultaneously.

14. The apparatus of claim 9, wherein the stator has an axial stack length and an outside diameter perpendicular to the length, and the ratio of the outside diameter to the axial stack length is approximately 2:1.

15. Apparatus, comprising:
a stator defining a stator bore, the stator comprising
a stator yoke having a stator yoke thickness, and
a plurality of stator teeth, the stator teeth having a stator tooth length,
wherein the stator yoke thickness is greater than the stator tooth length; and
a rotor mounted in the bore to rotate, the rotor comprising
a rotor yoke having a rotor yoke thickness, and
rotor teeth coupled to the yoke, the rotor teeth having a rotor tooth length,
wherein the rotor yoke thickness is greater than the rotor tooth length,
wherein a sum of the stator yoke thickness and the stator tooth length approximately equals a sum of the rotor yoke thickness and the rotor tooth length.

16. The apparatus of claim 15, wherein the rotor and stator have plates, the plates of the rotor and the stator being adapted to drive most of the stator teeth of a pole and most of the rotor teeth of the pole into approximately equal levels of deep magnetic saturation simultaneously.

17. The apparatus of claim 15,
wherein each of the stator teeth includes a center portion that extends from a bottom portion proximal the yoke to a tip portion, with adjacent teeth defining a stator slot between them, each stator slot having a stator slot bottom extending along a stator slot bottom length, and
wherein the center portion has a tooth width that is less than or equal to one half the stator slot bottom length, the tooth width also being smaller than the distance between adjacent stator tooth center portions.

18. The apparatus of claim 15, wherein a stator winding coupled to the stator is adapted to generate a substantially non-sinusoidal magneto-motive-force curve.

19. The apparatus of claim 18, wherein a stator winding coupled to the stator is adapted to generate an approximately trapezoidal magneto-motive-force curve.

20. The apparatus of claim 15, wherein there are at least two layers of coils in a single stator slot.

* * * * *